(12) United States Patent
Ryu et al.

(10) Patent No.: US 11,323,923 B2
(45) Date of Patent: May 3, 2022

(54) METHOD AND SYSTEM FOR COMMUNICATION IN WIRELESS COMMUNICATION NETWORK

(71) Applicant: Samsung Electronics Co., Ltd., Suwon-si (KR)

(72) Inventors: Seungbo Ryu, Yongin-si (KR); Daejoong Kim, Yongin-si (KR); Namryul Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 246 days.

(21) Appl. No.: 16/639,225

(22) PCT Filed: Dec. 15, 2017

(86) PCT No.: PCT/KR2017/014886
§ 371 (c)(1),
(2) Date: Feb. 14, 2020

(87) PCT Pub. No.: WO2019/039672
PCT Pub. Date: Feb. 28, 2019

(65) Prior Publication Data
US 2020/0205042 A1 Jun. 25, 2020

(30) Foreign Application Priority Data

Aug. 21, 2017 (KR) ........................ 10-2017-0105763

(51) Int. Cl.
*H04W 36/00* (2009.01)
*H04W 36/08* (2009.01)
*H04W 36/16* (2009.01)

(52) U.S. Cl.
CPC ....... *H04W 36/0027* (2013.01); *H04W 36/08* (2013.01); *H04W 36/165* (2013.01)

(58) Field of Classification Search
None
See application file for complete search history.

(56) References Cited

U.S. PATENT DOCUMENTS

2015/0264621 A1  9/2015  Sivanesan et al.
2016/0135103 A1  5/2016  Lee et al.
(Continued)

FOREIGN PATENT DOCUMENTS

WO    2015-046957 A1    4/2015
WO    2015-108337 A1    7/2015

OTHER PUBLICATIONS

Extended European Search Report dated May 14, 2020, issued in a counterpart European Application No. 17922679.0-1212/3657855.
(Continued)

*Primary Examiner* — Robert M Morlan
(74) *Attorney, Agent, or Firm* — Jefferson IP Law, LLP

(57) ABSTRACT

The present disclosure is a research which has been conducted with the support of the "Cross-Departmental Giga KOREA Project" of the government (the Ministry of Science and ICT) in 2017 (No. GK17N0100, Development for mmWave-based 5G mobile communication system). The present disclosure relates to a communication technique for convergence of a 5G communication system for supporting a higher data transmission rate beyond a 4G system with an IoT technology, and a system therefor. The present disclosure may be applied to an intelligent service (for example, smart home, smart building, smart city, smart car or connected car, health care, digital education, retail business, security and safety-related service, etc.) on the basis of a 5G communication technology and IoT-related technology. The present disclosure provides a system and a control method therefor, which can prevent, when a dual connectivity scheme is used, delay and data loss due to an operation of releasing and adding a secondary node cell or a process of
(Continued)

resetting a user plane and updating a security key and a procedure of forwarding data between user planes through a common anchored user plane and changing (updating) a path between the user plane and a core.

14 Claims, 15 Drawing Sheets

(56) References Cited

U.S. PATENT DOCUMENTS

| | | | |
|---|---|---|---|
| 2016/0323805 A1 | 11/2016 | Ryu et al. | |
| 2016/0337925 A1 | 11/2016 | Fujishiro et al. | |
| 2016/0373975 A1 | 12/2016 | Xu et al. | |
| 2018/0014229 A1* | 1/2018 | Chiba | H04W 76/15 |
| 2018/0132150 A1* | 5/2018 | Du | H04W 36/18 |
| 2021/0352543 A1* | 11/2021 | Purkayastha | H04W 36/08 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)", 3GPP Draft; TS 37.340 V0.2.1, 37340-021RM, 3rd Generation Partnership Project (3GPP), XP051317537; Aug. 20, 2017. Retrieved from the Internet: URL:http://www.3gpp.org/ftp/Meetings_3GPP_SYNC/RAN2/Docs/.

Intel Corporation: "RRC aspects of unifying split bearer types", 3GPP Draft; R2-1707037-split-Bearer-Merge-V4, 3rd Generation Partnership Project (3GPP), vol. RAN WG2, No. XP051301533; Jun. 26, 2017, Qingdao, China. Retrieved from the Internet: URL:http://www.3gpp.org/ftp/Meetings_3GPP_SYNC/RAN2/Docs/.

Ericsson: "Introduction of option 3—Dual Connectivity with NR in E-UTRAN—RAN3 parts", 3GPP Draft; R3-171827 was R3-171152 Draft Stage 2 CR for Option 3, 3rd Generation Partnership Project (3GPP), vol. RAN WG3, No. XP051276605; May 14, 2017, Hangzhou, China. Retrieved from the Internet: URL:http://www.3gpp.org/ftp/Meeti ngs_3GPP SYNC/RAN3/DOCS/.

Zte et al.: "Consideration on the bearer type harmonization", 3GPP Draft; R2-1706980 Consideration on The Bearer Type Harmonisation, 3rd Generation Partnership Project (3GPP),vol. RAN WG2, No. XP051301477,; Jun. 26, 2017, Qingdao, China. Retrieved from the Internet: URL:http://www.3gpp.org/ftp/Meetings_3GPP_SYNC/RAN2/Docs/.

"3rd Generation Partnership Project; Technical Specification Group Radio Access Network; NG Radio Access Network (NG-RAN); Xn interface user plane protocol (Release 15)", 3GPP Draft; TS 38.425 V0.1.0, 38425-010, 3rd Generation Partnership Project (3GPP), XP051301985; Jun. 26, 2017 Retrieved from the Internet: URL:http://www.3gpp.org/ftp/Meetings_3GPP_SYNC/RAN3/Docs/.

Alcatel-Lucent et al., "Security functionality for dual connectivity", S3-140957, 3GPP TSG SA3 Meeting #75, Sapporo, Japan, May 19, 2014.

Ericsson, "A common user plane architecture for dual connectivity", R2-134224, San Francisco, USA, Nov. 1, 2013.

Ericsson, "Control plane aspects of dual connectivity", R2-134226, San Francisco, USA, Nov. 2, 2013.

* cited by examiner

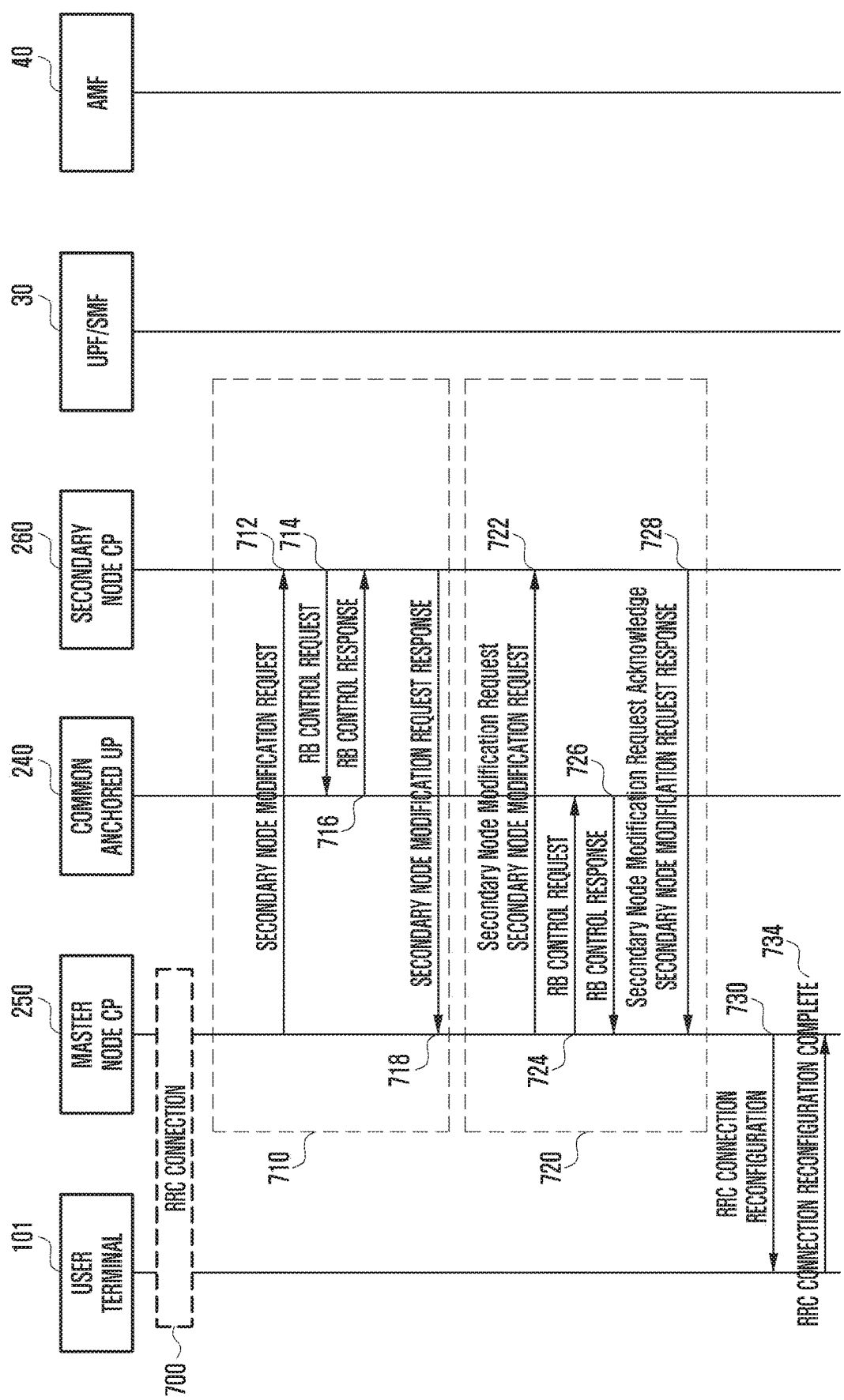

METHOD AND SYSTEM FOR COMMUNICATION IN WIRELESS COMMUNICATION NETWORK

TECHNICAL FIELD

The disclosure relates to a method and system for providing communication in a wireless communication network and, in particular, to a method and system for providing communication to a terminal in a dual connectivity mode.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

In a wireless communication network, a terminal may be in a state of being connected to two different base stations, i.e., dual connectivity state. Dual connectivity is useful for various purposes such as boosting the data rate of the terminal. In the dual connectivity mode, the terminal may be connected to two or more base stations (or access points equivalent thereto) belonging to the same network or heterogeneous networks.

In the dual connectivity mode, the network and the terminal may operate in association with a master cell belonging to a certain base station (or equivalent thereto) and a secondary cell belonging to the same base station as the master cell or a different base station (or equivalent thereto). As the terminal in the dual connectivity mode moves, the master cell may be changed, or the secondary cell is added, deleted, or modified. In this case, the terminal and the network have to perform a secondary cell release and addition procedure.

The movement of the terminal may cause change of the master cell while maintaining the secondary cell. According to the current standard, if the movement of the terminal causes change of the master cell or addition/deletion/modification of the secondary cell, it is inevitable for a secondary cell release and addition procedure to be performed. However, if the secondary cell release and addition procedure is performed unnecessarily, this is likely to cause user data loss or service delay. In particular, the result of a service breakdown or delay caused by performance of such an unnecessary procedure is significant service quality degradation for users who are consuming a real-time or pseudo real-time data service. Particularly in inter-radio access technology dual connectivity (inter-RAT DC) for an LTE base station as the master cell and a 5G base station as the secondary cell, if the secondary cell is in use for providing a massive data service, a service delay is likely to cause significant service breakdown.

The disclosure presents research conducted with the financial support of the "Government-wide Giga KOREA project" led by the Ministry of Science, ICT, and Future Planning in 2017.

DISCLOSURE OF INVENTION

Technical Problem

The disclosure provides seamless data transmission/reception methods and apparatuses of a terminal in a dual connectivity mode in a wireless communication system.

The disclosure also provides methods and devices for reducing unnecessary secondary cell release and addition operations.

The disclosure also provides methods and apparatuses for utilizing resources efficiently by reducing unnecessary secondary cell release and addition operations.

The disclosure also provides methods and apparatuses for improving service quality by reducing unnecessary secondary cell release and addition operations.

The disclosure also provides methods and apparatuses for reducing power consumption of a terminal by reducing unnecessary secondary cell release and addition operations.

Solution to Problem

According to a disclosed embodiment, a method for a master node control plane to provide dual connectivity to a user terminal in a wireless communication network includes transmitting a secondary node addition request message to a secondary control plane based on a user terminal in an RRC connected state to the master node control plane needing dual connectivity, transmitting an RRC connection reconfiguration message to the user terminal based on receiving a secondary node addition request response message from the secondary control plane, transmitting a secondary node reconfiguration complete message to the secondary control plane based on receiving an RRC connection reconfiguration complete message from the user terminal, and performing a path update procedure for the user terminal with an access and mobility function entity.

According to another disclosed embodiment, a method for a secondary node control plane to provide dual connectivity to a user terminal in a wireless communication network includes receiving a secondary node addition request message for a user terminal in a connected state to a master node control plane from the master node control plane, generating and transmitting a secondary node addition request response message to the master node control plane in response to the secondary node addition request message, and performing a random access procedure with the user terminal based on receiving a secondary node reconfiguration complete message from the master node control plane.

According to another disclosed embodiment, a method for a common anchored user plane to provide dual connectivity to a user terminal in a wireless communication network includes maintaining a bearer configured to the user terminal based on receiving a radio bearer control request message including a keep indicator from a master node control plane or a secondary node control plane for the user terminal in an RRC connected state to the master node control plane, generating and transmitting a radio bearer control response message to the control plane that transmitted the radio bearer control request message, generating and transmitting a radio bearer resume response message to the master node control plane and the secondary node control plane based on receiving a radio bearer resume request message from the master node control plane and the secondary node control plane, performing a bearer path update for transmitting data from an access and mobility function entity to the user terminal, and transmitting user data to the user terminal through an updated bearer.

According to another disclosed embodiment, a wireless communication system for supporting dual connectivity includes a plurality of master radio communication units that have respective communication areas equal or different in size and support the dual connectivity for at least one user terminal and that include at least part of a communication area of at least one secondary node radio communication unit, a common anchored user plane configured to communicate user data with the plurality of radio communication units, forward the user data to the user terminal located in the communication area of one of the plurality of radio communication units, and perform an operation for maintaining a bearer for transmitting the user data to the user terminal for at least one of secondary node addition, secondary node release, secondary node's master node modification, secondary node change, handover, bearer type change, and inter-master node handover, a secondary node control plane configured to control the radio communication unit of the secondary node to transmit the user data via the common anchored user plane and maintain the bearer for transmitting the user data to the user terminal for at least one of the secondary node addition, secondary node release, secondary node's master node modification, secondary node change, handover, bearer type change, and inter-master node handover, and a master node control plane configured to control the plurality of master radio communication units to transmit the user data vis the common anchored user plane and maintain the bearer for transmitting the user data to the user terminal for at least one of the secondary node addition, secondary node release, secondary node's master node modification, secondary node change, handover, bearer type change, and inter-master node handover.

Advantageous Effects of Invention

The disclosed embodiments are advantageous in terms of providing a terminal in a dual connectivity mode with a seamless data communication service and improving resource utilization efficiency by reducing unnecessary secondary cell release and addition operations in a wireless communication system. The disclosed embodiments are also advantageous in terms of providing a service seamlessly, improving a service quality, and reducing power consumption of a terminal by reducing unnecessary secondary cell release and addition operations.

BRIEF DESCRIPTION OF DRAWINGS

FIGS. 7A and 7B are a signal flow diagram illustrating a procedure for changing bearer type in dual connectivity according to a disclosed embodiment.

MODE FOR THE INVENTION

Hereinafter, various embodiments are described in detail with reference to the accompanying drawings. The same reference numbers are used throughout the drawings to refer to the same or like parts. It is noted that the accompanying drawings are provided to help understand the disclosure and are not intended to limit the disclosure thereto. Detailed descriptions of well-known functions and structures incorporated herein may be omitted to avoid obscuring the subject matter of the disclosure. It should be noted that the following description is made only of the parts necessary to help understand the operations according to various disclosed embodiments and is not made of other parts to avoid obscuring the subject matter of the disclosure.

Figure 1A:
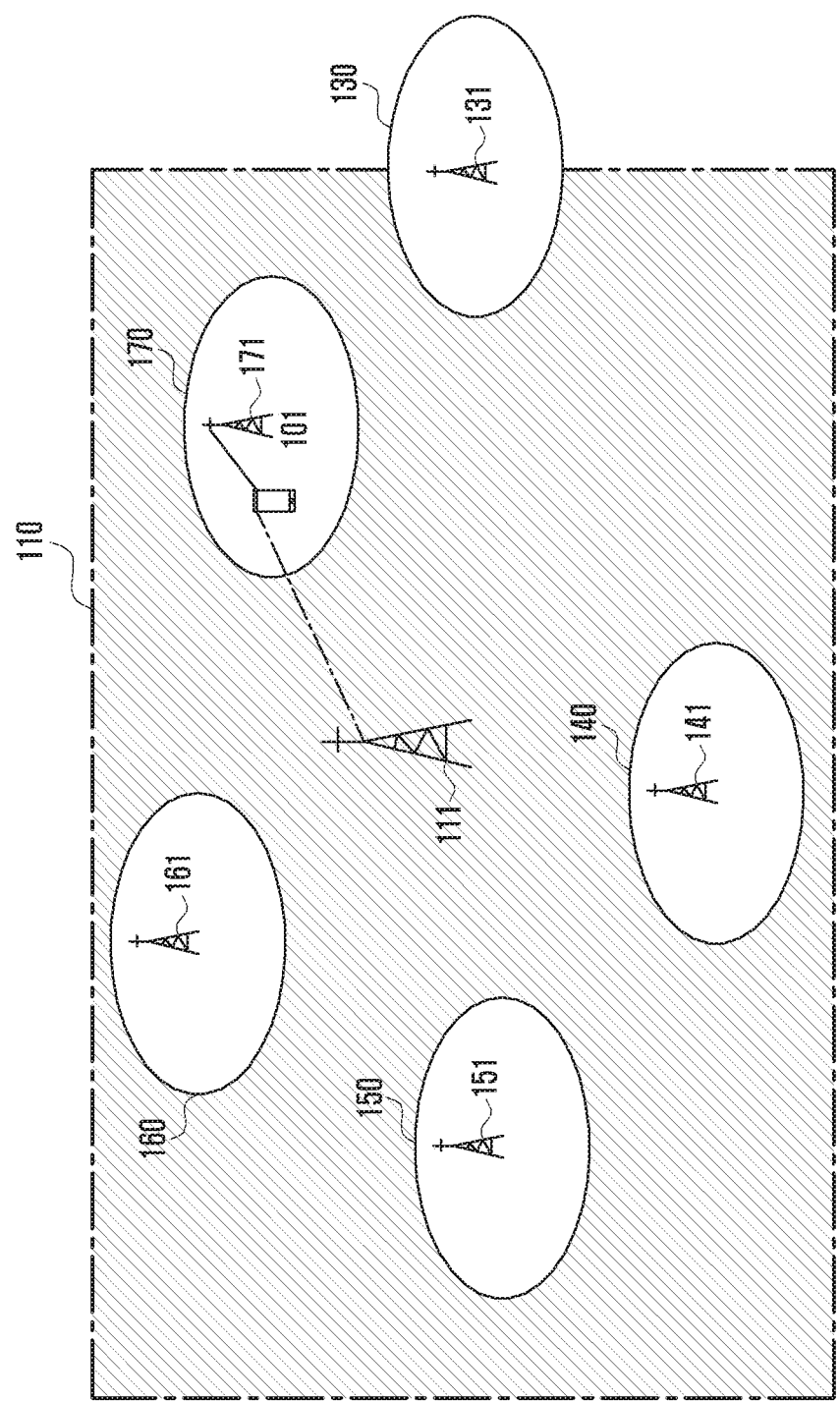
FIG. 1A is a conceptual diagram illustrating a dual connectivity situation.

FIG. 1A is a conceptual diagram illustrating a dual connectivity situation.

In reference to FIG. 1A, a first base station 111 and a third base station 131, a fourth base station 141, a fifth base station 151, a sixth base station, and a seventh base station are exemplarily depicted. The first base station 111 is a base station hosting a master cell with a broad communication area 110, and the third to seventh base stations 131, 141, 151, 161, and 171 are base stations hosting secondary cells with respective communication areas 130, 140, 150, 160, and 170.

As shown in FIG. 1A, a terminal 101 is located both in the communication area 110 of the master cell 111 and the communication area 170 of the seventh base station 171. Accordingly, the UE 101 may connect to the first base station 111 and the seventh base station simultaneously or sequentially. In the case of being connected to the two base stations 111 and 117, the terminal 101 may first attach to the first base station 111 or second base station 171. The terminal 101 may be simultaneously connected to the first and seventh base stations 111 and 171 and allocated different carrier frequencies (hereinafter, interchangeably referred to as radio resources) by each of the base stations for communication. In this manner, if the terminal is connected to two physically separated base stations 111 and 171, this is referred to as dual connectivity (DC).

In this situation, if the terminal 101 moves out of the communication area 170 of the seventh base station 171, the UE 101 has to release the connection to the seventh base station 171. However, the terminal 101 may still stay in the communication area 110 of the first base station 111 and communicate with the first base station 111 even though it is out of the communication area 170 of the seventh base station 171. Because the terminal 101 stays within the communication area of the first base station 111 as the master base station, there may not be any change in mobility operations.

Descriptions are made of situations similar to the DC situation. In an LTE-A system called 4G network a carrier aggregation scheme is adopted. Typically, carrier aggregation is a technology for one or two physically separated base stations to allocate two or more different carrier frequencies to one UE with main operations (e.g., data aggregation and flow control) in the MAC layer of a RAN protocol stack in an ideal backhaul environment, e.g., in an inter-base station latency range equal to or less than 1 ms. In the dual connectivity, two physically or geographically different base stations or cells allocate different radio resources to a terminal. That is, in the dual connectivity scheme, the base stations or cells allocating radio resources to the terminal may have different communication areas. As exemplified in FIG. 1A, if the communication areas differ, this means that the whole communication area of the secondary cell (e.g., communication area 140 of the fourth base station 141, communication area 150 of the fifth base station 151, communication area 160 of the sixth base station 161, and communication area 170 of the seventh base station 171) is included in the communication area 110 of the first base station 111 operating as the master base station, or part of the communication area of the secondary cell base station may be included in the communication area 110 of the first base station 111.

In dual connectivity, a master node may support one of various RATs (e.g., LTE, 5G, or another RAT), and a secondary node may support one of the various RATs (e.g., LTE, 5G, or another RAT).

Meanwhile, dual connectivity is similar to a handover; there are similarities and differences between dual connectivity and a handover as follows.

In a cellular system, two adjacent base stations may have different communication areas. Because the two base stations are adjacent to each other, the communication areas of the two base station are overlapped to form an overlapping area in which a terminal can receive signals from both of the two base stations and can be handed over from one to the other base station.

In the case of dual connectivity, the whole communication area of the secondary base station is included in the communication area of the master base station. In dual connectivity, the master cell base station may have a communication area in which there are two more secondary cell base stations. In the case where there are two or more base stations or cells within the same geographical area, the terminal may connect to one (if the terminal does not support dual connectivity) or more (if the terminal supports dual connectivity) base stations. As described above, the terminal may connect to the master and secondary cell base stations simultaneously or sequentially. A terminal supporting dual connectivity may maintain communication with the master base station even when it moves out of the communication area of the secondary base station. In dual connectivity, if the terminal stays in the communication area of the master base station even if it moves out of the communication area of the secondary base station, mobility management of the terminal is not performed.

However, in the case of a handover, the terminal may not be connected simultaneously to two base stations (in the case of a hard handover or two base stations operating in different carrier frequencies) or, even when being connected to two base stations for a moment, it has to perform a release procedure (in the case of a soft handover or two base stations operating in the same carrier frequency). That is, in the handover, maintaining connections to two base stations is not allowed. In the case of handing the terminal over, it is necessary to perform mobility management because there has been a change of base station.

There are differences between a handover and dual connectivity; and descriptions thereof are made just to the extent of understanding.

As described above, although dual connectivity is similar to a handover and carrier aggregation in some respects, they are actually different from each other. Dual connectivity makes it possible to implement a high-speed data transmission because a terminal is allocated different carrier frequencies by different base stations or cells.

In a cellular communication system, base stations having different coverages are deployed, and dual connectivity may be configured for various purposes. For example, it may be necessary to deploy a cell having a small coverage (e.g., small cell and pico cell) to eliminate a coverage hole in consideration of buildings and geographical features. As an another example, it may occur that base stations operating in a low frequency band for covering large areas and base stations operating in a high frequency band for covering small areas coexist. As another example, it may occur that base stations are deployed such that 3G and 4G networks or 4G and 5G networks have different communication areas. That is, the base stations of the heterogeneous networks may be deployed to have different communication areas. A description is made of the case where a terminal mobility change occurs in dual connectivity.

Figure 1B:
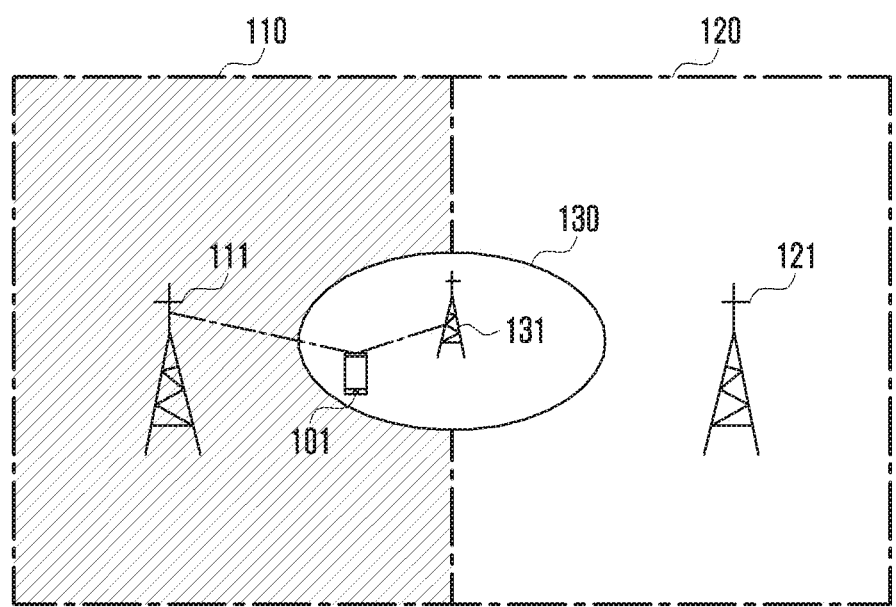
FIGS. 1B and 1C are diagrams for explaining mobility of a terminal in a dual connectivity mode in a situation where a secondary cell base station is located in a boundary area between master base stations.
Figure 1C:
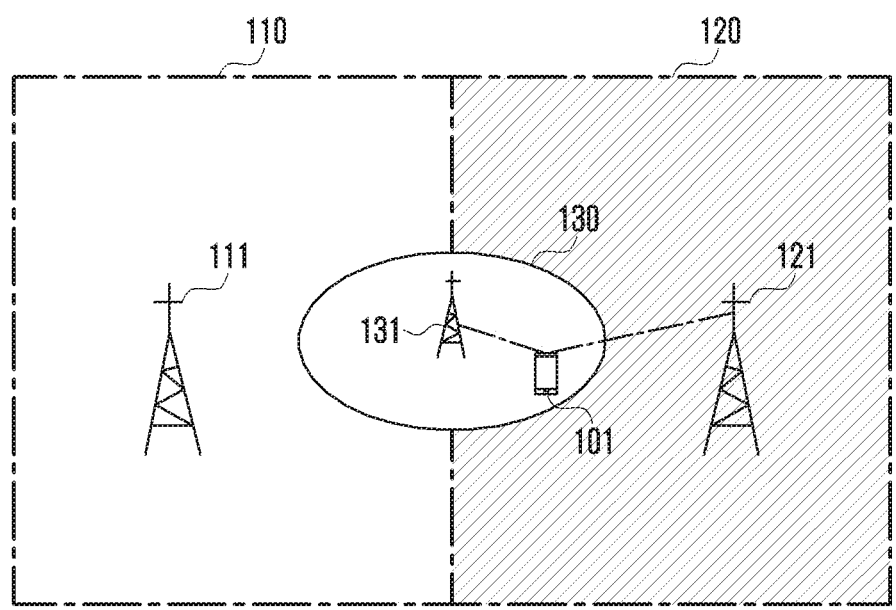

FIGS. 1B and 1C are diagrams for explaining mobility of a terminal in a dual connectivity mode in a situation where a secondary cell base station is located in a boundary area between master base stations.

In reference to FIG. 1B, the terminal connected to the seventh base station 171 as shown in FIG. 1A moves into the communication area 130 of the third base station 131. Even at this moment, the terminal 101 is still located within the communication area 110 of the first base station 111. Accordingly, the terminal 101 may connect to the third base station through an attach procedure with the third base station 131. In this manner, the terminal may receive the dual connectivity service via the first base station 111 and the third base station 131. FIG. 1B exemplifies the case where the terminal 101 is allocated radio resources separately from the first base station 111 and the third base station 131.

The terminal 101 may move out of the communication area 111 of the first base station, while remaining within communication area 130 of the third base station 131. This is the case in FIG. 1C.

In reference to FIG. 1C, the terminal moves from the communication area of the first base station 111 as a master base station to the communication area of the second base station 121 as another base station, while remaining within the communication area 130 of the third base station 131. In this case, it is necessary to release the connection to the third base station 131 as well as the connection to the first base station 111 in dual connectivity. That is, the terminal has to be handed over from the first base station 111 to the second base station 121, or release a call connection, disconnect from the first base station, and perform a new attach procedure with the second base station; in this case, the terminal 101 also has to perform a connection release procedure with the third base station 131 as a secondary cell base station.

This is the case even when the third base station 131 is implemented as a heterogeneous network as well as the same homogeneous network as the first and second base stations 111 and 121. Although the third base station 131 as the secondary cell base station is maintained regardless of the cellular communication system being implemented with homogeneous networks or heterogeneous networks, any change of the master cell base stations may involve a release and addition procedure in association with the secondary cell base station. As shown in FIG. 1C, the terminal 101 may have a normal connection with the third base station 131 as the secondary cell base station.

As shown in FIG. 1C, in the case where the terminal 101 has a normal connection with the third base station 131 as the secondary cell base station, the procedure for releasing and (re)adding the third base station 131 for the terminal 101, which results from the mobility operation of the first base station 111, may be regarded as an unnecessary operation.

There may also be various situations requiring a procedure of releasing and (re)adding the secondary base station or at least releasing and reestablishing a user plane (e.g., PDCP layer) for the UE. Some of such situations are enumerated below.

In the following descriptions, the terms "master cell" and "master cell base station" are referred to as "master node". The terms "second cell", "second base station", "secondary cell", and "secondary cell base station" are referred to as "secondary node". However, a master cell, a master cell base station, a base station operating as master, a first master cell, a second master cell, . . . , a first master cell base station, a second master cell base station should be all understood as master nodes. Likewise, a second cell, a second base station, a secondary cell, a secondary cell base station, a base station operating as a secondary cell, a secondary cell, and the like should be all understood as secondary nodes.

Examples of the procedure of releasing and (re)adding a secondary node or releasing and reestablishing at least the user plane (e.g., PDCP layer) to a terminal may include followings:

1) Secondary Node Addition
2) Secondary Node Release
3) Secondary Node Modification
4) PSCell change within Secondary Node
5) PSCell change between different Secondary Nodes
6) Dual connectivity-non-supporting node to dual connectivity-supporting master node change (Node to Master Node change)
7) Intra-Master Node handover procedure with Secondary Node configuration
8) Inter-Master Node handover without Secondary Node change
9) DC bearer type change For the above operations, it is necessary to release and add the secondary node (secondary cell) or at least release and reestablish the user plane (e.g., PDCP layer). It is also necessary to perform a user plane reset security key update procedure for the secondary node. This means that the secondary cell release and addition procedure should be performed for all nodes in the dual connectivity mode. Even a connection that can remain normal (as shown in FIG. 1C) should be released and then re-added.

Releasing and adding at least one node (secondary cell release and addition) or releasing and reestablishing at least the user plane (e.g., PDCP layer) in association with a terminal having a call in progress may involve user data loss or delay. This may cause a service breakdown from the viewpoint of the user. Particularly in the inter-RAT dual connectivity between LTE for the master node and 5G for the secondary node, if the secondary node is in use for providing a massive data service, the secondary node release and addition procedure may cause significant service breakdown.

The disclosure provides a seamless data transmission/reception method and apparatus that is capable of protecting a terminal operating in the dual connectivity mode against a service breakdown. Hereinafter, the seamless data transmission/reception method, apparatus, and system architecture are described.

Figure 2A:
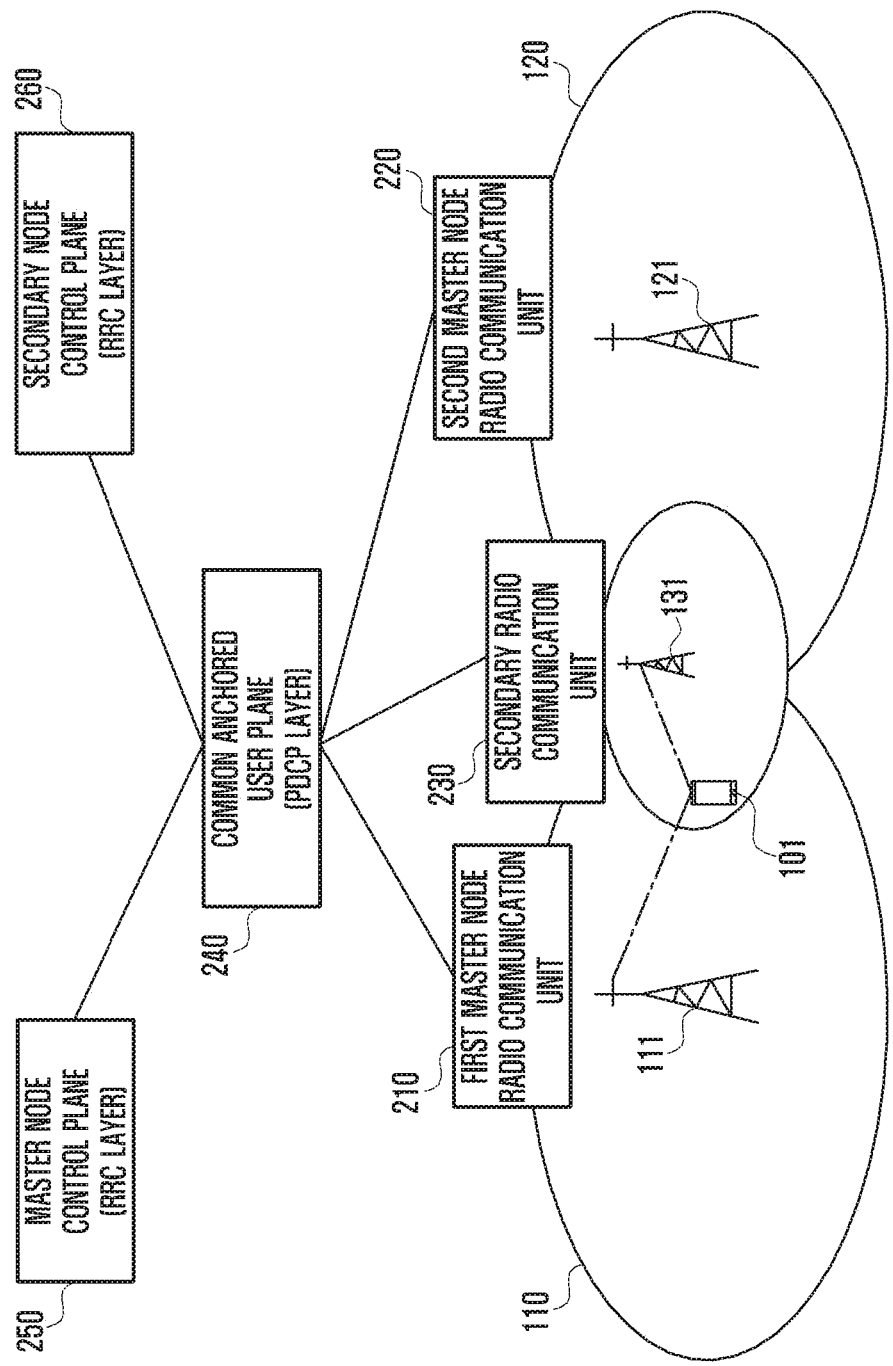
FIG. 2A is a conceptual diagram illustrating common anchored user plane-based nodes according to a disclosed embodiment.

FIG. 2A is a conceptual diagram illustrating common anchored user plane-based nodes according to a disclosed embodiment.

In reference to FIG. 2A, a terminal is associated with base stations as described with reference to FIG. 1B. That is, the first and second base stations 111 and 121 that may operate as master nodes have respective communication areas 110 and 120, and the third base station 131 is located in an area formed by an overlap between the communication areas 110 and 120 of the first and second base stations 111 and 121. The terminal 101 is communicating with the first and third base stations 111 and 131 in the dual connectivity mode.

Here, the first base station 111 includes a master node control plane 250 and a master node first radio communication unit 210 and shares a common anchored user plane with other nodes, and the second base station 121 includes the master node control plane 250 and a master node second radio communication unit 220 and shares the common anchored user plane with other nodes. The third base station 131 also includes a secondary node control plane 260 and a secondary node radio communication unit 230 and shares the common anchored user plane with other nodes. Here, the master node first radio communication unit 210 and the master node second radio communication unit 220 may interwork with the common anchored user plane 240 and the master node control plane 250 such that the first and second base stations operate as a single master node; the master node first radio communication unit 210 may interwork with the common anchored user plane 240 and the master node control plane 250, and the master node second radio communication unit 220 may interwork with the common anchored user plane 240 and another master node control plane (not shown) such that the first and second base stations operate as separate master nodes. That is, there may be one or more master node control planes, one or more secondary node control plans, one or more master node radio communication units, and one or more secondary node radio communication units centered around one common anchored user plane 240. It should be noted that the disclosed embodiments are directed to one of the above situations.

The master node first radio communication unit 210, the master node second radio communication unit 220, and the secondary node radio communication unit 230 may each include a radio link control (RLC) layer, a media access control (MAC) layer, and a physical layer. The layers being included in the master node first radio communication unit 210, the master node second radio communication node 220, and the secondary node radio communication unit 230 may be differently configured according to options defined in the standard. For example, the master node first radio communication unit 210, the master node second radio communication unit 220, and the secondary node radio communication unit 230 may include only the physical layer, and the common anchored user plane may include the remaining layers (PDCP, RLC, and MAC layers). It should be noted that the disclosed embodiments are directed to one of the above cases.

In a disclosed embodiment, the radio protocol layers of the master and secondary nodes may be sorted out as user planes 240, 210, 220, and 230 and control planes 250 and 260. In the legacy technology, there are just master and secondary node systems. For example, an individual user plane (not shown) instead of the common anchored user plane, the master node first radio communication unit 210, and a first master node control layer (not shown) constitute a master node; an individual user plane (not shown), the master node second radio communication unit 220, and a second master node control plane (not shown) constitute another master node; and an individual user plane (not shown), the secondary node radio communication unit 230, and a secondary node control layer (not shown) constitute a secondary node.

In an disclosed embodiment, the radio protocol layer of the first master node, the radio protocol layer of the second master node, and the radio protocol layer of the secondary node are separated as per-control plane and per-user plane entities (CP-UP separation) according to processing properties. The common anchored user plane 240 that operates in common with the radio protocol layer of the first master node, the radio protocol layer of the second master node, and the radio protocol layer of the secondary node may be used in common by the master and secondary nodes.

That is, the common anchored user plane 240 is configured as a common control plane with components that should be processed in the user plane, the components being separated from the radio protocol layers of the master and secondary nodes. Accordingly, the master node control plane 250 and the secondary node control plane 260 are separated from each other. In the disclosed embodiment, the master node control plane 250 and the secondary node control plane 260 are separately configured, and components that can be processed by the master and secondary nodes in common are integrated into the common anchored user plane 250. A detailed description thereof is made later with reference to the accompanying drawings.

According to a disclosed embodiment, in the case of establishing a common anchored user plane entity, the common anchored user plane 240 may be configured with various options (e.g., PDCP, PDCP/RLC, or PDCP/RLC/MAC layers) according to a radio access network (RAN) protocol split option.

Figure 2B:
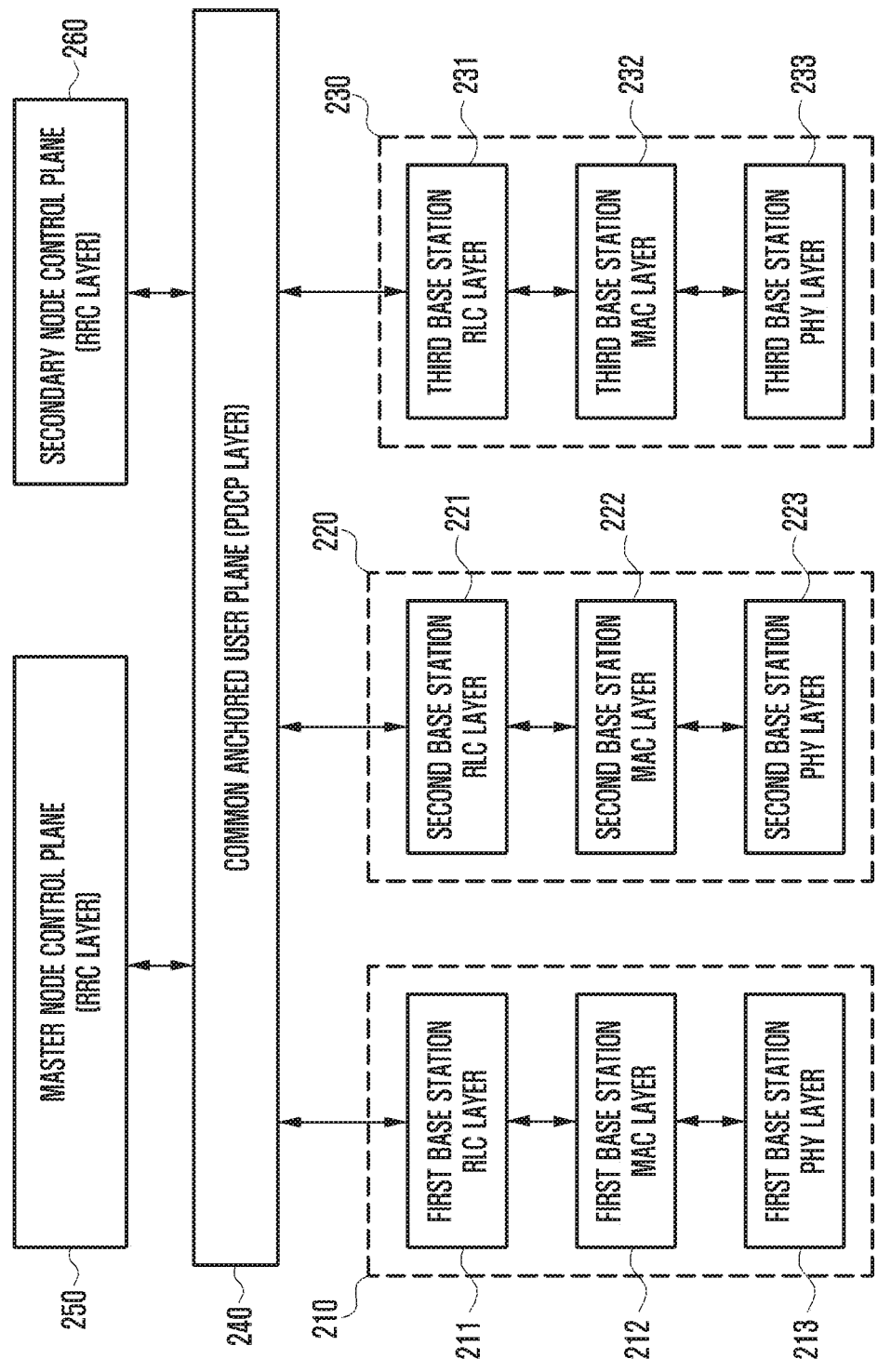
FIG. 2B is a diagram illustrating a protocol stack of common anchored user plane-based nodes according to a disclosed embodiment.

FIG. 2B is a diagram illustrating a protocol stack of common anchored user plane-based nodes according to a disclosed embodiment.

According to a disclosed embodiment, the common anchored user plane 240 may be configured with only the PDCP layer as described with reference to FIG. 2B. However, the common anchored user plane 240 may be configured to include PDCP and RLC layers or PDCP, RLC, and MAC layers according to an option of the standard. The embodiment of FIG. 2B is directed to the case where the user plane 240 has a protocol stack configured with only the PDCP layer.

In reference to FIG. 2B, the radio communication unit 210 of the first base station 111 may include a first base station RLC layer 211, a first base station MAC layer 212, and a first base station physical layer 213. The radio communication unit 220 of the second base station 121 may include a second base station RLC layer 221, a second base station MAC layer 222, and a second base station physical layer 223. As described above, the first base station 111 and the second base station may be master nodes, master cells, or master base stations having coverage areas. The radio communication unit 230 of the third base station 131 may include a third base station RLC layer 231, a third base station MAC layer 232, and a third base station physical layer 233.

The base stations may be geometrically deployed such that the radio communication unit 210 of the first base station is located at the center of the coverage area of the first base station 111, the radio communication unit 220 of the second base station 121 is located at the center of the coverage of the second base station 121, and the radio communication unit 230 of the third base station 131 is located at the center of the coverage of the third base station 131. The common anchored user plane 240 and the master and secondary node control planes 250 and 260 may be located in a predetermined separate area or a geographical area of at least one of the base stations operating as master base stations.

In the embodiment of FIG. 2B, the common anchored user plane 240 is configured only with the PDCP layer. However, the user plane 240 may also be configured to have the PDCP and RLC layers or PDCP, RLC, and MAC layers as described above, and the proposed method may be applied to such cases in the same manner As described with reference to FIGS. 2A and 2B, the proposed method is advantageous in terms of saving resources and power by separating the control plane and the user plane and pooling common resources in the common anchored user plane 240. The proposed method is also advantageous in terms of improving inefficient reset/reestablishment procedures in the legacy user plane and providing data services seamlessly in the dual connectivity mode.

In the case of separating the control and user planes as described above, it may be necessary to distinguish between functions being performed in the master node control plane 250 and the secondary node control plane 260 and the function being formed in the common anchored user plane 240. Detailed descriptions thereof are made hereinafter.

(1) Functions being supported by control planes 250 and 260

PDCP, RLC, and MAC control

RRC functions (broadcast, paging, RRC connection management, and radio bearer or resource block (RB) control)

(2) Functions being supported by only master node control plane 250 among control planes NAS control (EPS bearer management, authentication, ECM-IDLE mobility handling, paging, security control, mobility functions, and UE management report/control)

(3) Functions being supported by common anchored user plane 240

User data processing through PDCP, RLC, or MAC sublayer or, in the case of applying Ran protocol split option2, user data processing in PDCP sublayer.

(4) Functions necessary on interface between control planes (CP) 250 and 260 and common anchored user plane 240 (UP)

CP-UP Interface Setup

CP-UP Interface Reset

UP control (UE Context setup/release, RB Configuration/Control, Security control, etc.)

RRC Signal Delivery

CP Change: For UP Anchoring-based SN change or MN handover

CP Relocation: For UP Anchoring-based inter-MN node HO (Inter NB HO

Meanwhile, the UE 101 in the dual connectivity mode has to perform the following operations according to the above functions. The UE 101 in the dual connectivity mode has to support simultaneous connections to the master and secondary nodes and CP and UP functions and have a common anchored UP configuration or support operations based on the corresponding configuration.

Descriptions are made in detail hereinafter of the operations and signal flows between the base station and the terminal configured as above for dual connectivity.

Figure 3A:
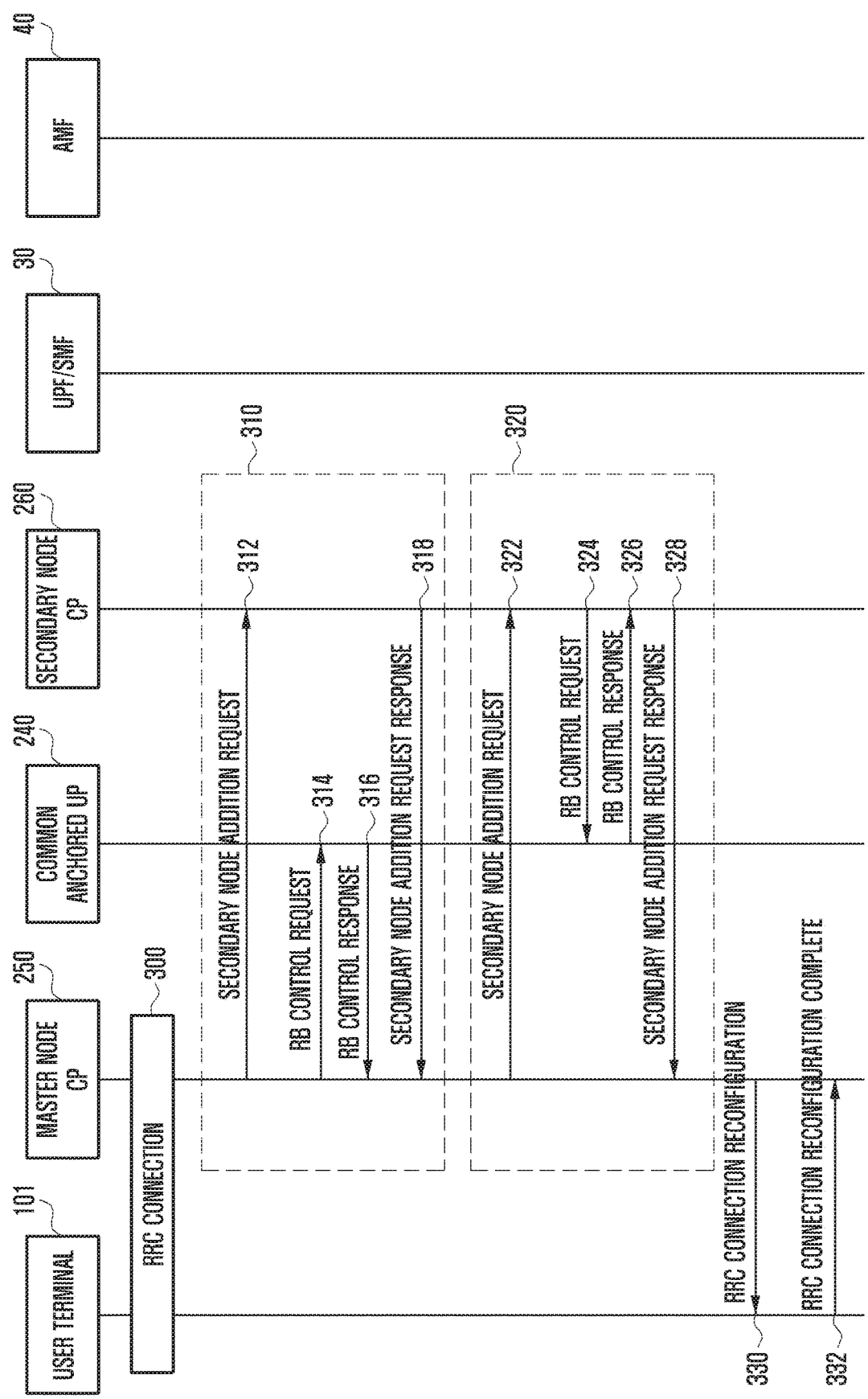
FIGS. 3A and 3B are a signal flow diagram illustrating a secondary cell addition procedure according to a disclosed embodiment.
Figure 3B:
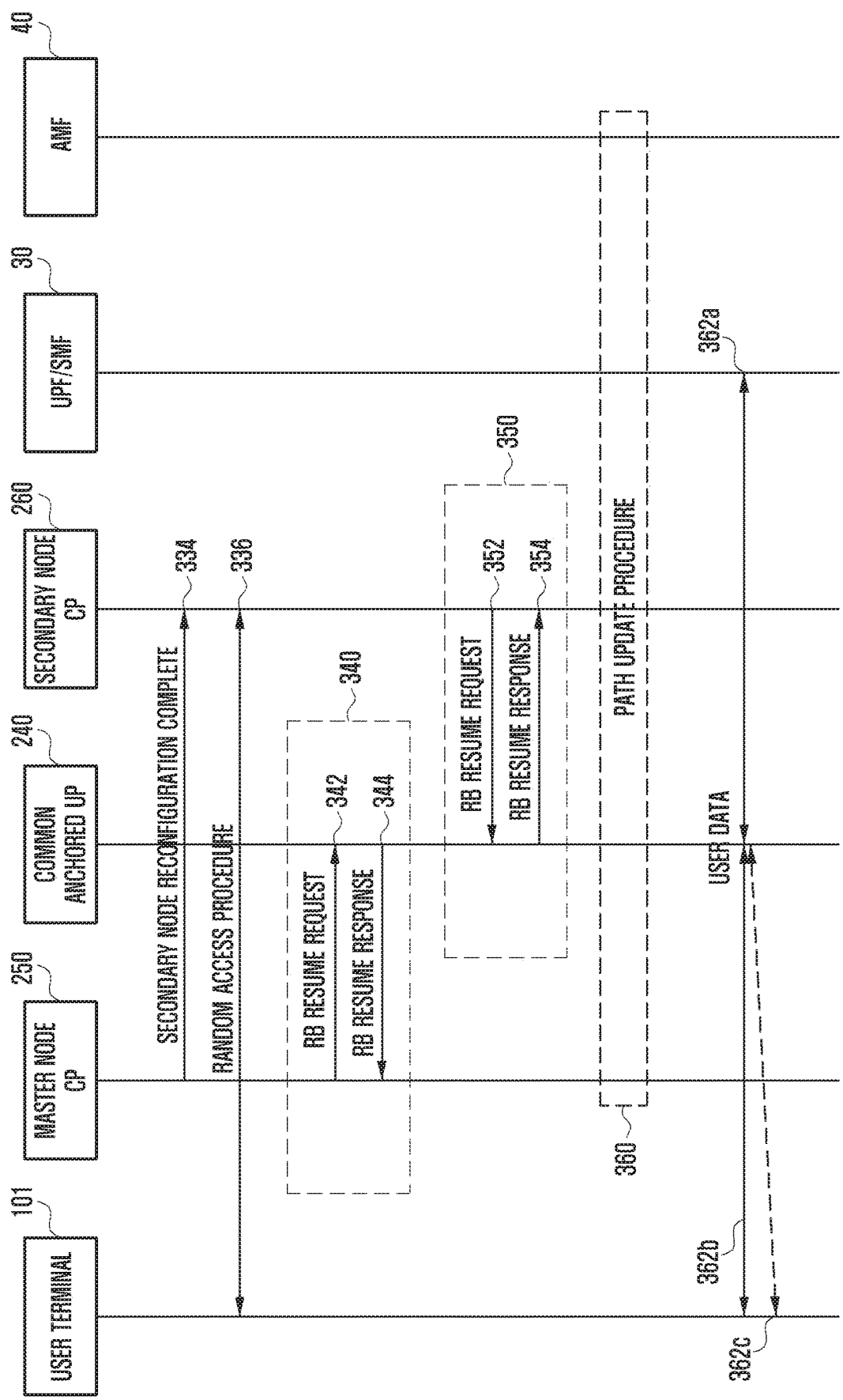

FIGS. 3A and 3B are signal flow diagrams illustrating a secondary cell addition procedure according to a disclosed embodiment.

The signal flows in FIG. 3A are followed by the signal flows in FIG. 3B. That is, because the procedure includes too many signal flows to be depicted in a single diagram, it has been depicted as two separated diagrams. In the following description, FIGS. 3A and 3B may be collectively referred to as FIG. 3 unless they need to be distinguished.

FIG. 3 shows a procedure for the terminal 101 that has connected to the first base station 101 as a master node base station attempting to connect to the third base station 131 as a secondary node. At operation 300, the terminal 101 may establish a connection with the first base station as the master node base station so as to be in an RRC connected state. The following description is made under the assumption that the terminal 101 is in the state of being connected to the first base station 101 as the master node. The description may be associated with a procedure for maintaining and resuming communication on a previously established bearer in a situation where a secondary node is added (cell addition) while the master node control plane 250 is transmitting user data to the terminal 101 via the common anchored user plane 240.

For example, it may occur that the master node control plane 250 needs information from the user terminal 101, e.g., signal strength information of the third base station as a secondary node, or a connection to the third base station 131 as the secondary base station. In this case, the master node control plane 250 determines to add a secondary node. In the case of determining to add a master cell group (MCG) bearer or an MCG split bearer as the secondary node, operation 310 is performed; in the case of determining to add a secondary cell group (SCG) bearer or an SCG split bearer as the secondary node, operation 320 is performed. Here, the MCG or MCG split bearer is a bearer for use by the master node control plane in controlling the common anchored user plane, and the SCG or SCG split bearer is a bearer for use by the secondary node control plane in controlling the common anchored user plane. In the following descriptions, the terms "MCG", "MCG split bearer", "SCG", and "SCG split bearer" are used for convenience of explanation. The master node control plane 250 may generate a secondary node addition request signal (carrying SCG Configinfo and Anchored UP Information) and transmit the signal to the secondary node control plane 260 at operation 312 or 322. In both the cases of having the MCG split bearer and SCG bearer/SCG split bearer, the secondary node addition request signal may include anchored UP information of the bearer connected to the terminal 101 in the common anchored user plane 240 (e.g., G (UP GPRS Tunneling Protocol (GTP) Tunnel Endpoint ID (TEID)) and IP address) in order to move the old bearer to a counterpart control plane. In the case of having the SCG bearer/SCG split bearer, the secondary node addition request signal may further include old security key information in use on the current bearer or new security key information and a security key change indicator.

Next, if the bearer requested to be added is an MCG split bearer, i.e., a bearer anchored in the master node control plane 250, the master node control plane 250 may transmit a radio bearer (RB) control request message to the common anchored user plane 240 at operation 314. Otherwise, if the bearer requested to be added is an SCG bearer or an SCG split bearer, i.e., anchored in the secondary node control plane 260, the secondary node control plane 260 may transmit an RB control request message to the common anchored user plane 240 at operation 324.

The common anchored user plane 240 may receive the RB control request message at operation 314 or 324 and, if the message includes a keep indicator, skip a releasing operation and maintain the old bearer allocated to the terminal 101 in the common anchored user plane 240. Here, if the bearer requested to be added is an SCG bearer or an SCG split bearer, i.e., a bearer anchored in the secondary node, the common anchored user plane 240 may transmit a target control plane TEID/IP address included in the RB control request message to change the association target from the old master node control plane 250 to the secondary node control plane 260. The common anchored user plane 240 may maintain the bearer allocated to the terminal 101 and, if necessary, change the association target and transmit, at operation 316, an RB control response message to the secondary node control plane 260.

FIG. 3 is directed to an exemplary case where if the type of the bearer requested to be added is an SCG bearer or SCG split bearer, i.e., a bearer anchored in the secondary node, the RB control response message is transmitted from the secondary node control plane 260 to the common anchored user plane 240, and the common anchored user plane 240 transmits the RB control response message to the secondary node control plane 250 at operation 326. In the case where the type of the bearer requested to be added is an MCB split bearer, i.e., if the master node control plane 250 transmits the RB control request message to the common anchored user plane 240, if necessary, the common anchored user plane transmits, at operation 316, to the master node control plane 250 the RB control response message including configuration values (e.g., dual connectivity bearer type change information, security key, security key change indicator, radio bearer keep/reset information, and reuse protocol type).

At operation 316 or 326, the master node control plane 250 or the secondary node control plane 260 receives the RB control response message from the common anchored user plane 240, which may mean the correspond bearer setup is successfully completed in the common anchored user plane 240. After receiving the RB control response message, if necessary, the secondary node control plane 260 may transmit a secondary node addition request acknowledgment message to the master node control plane 250 at operation 318 or a secondary addition request acknowledgement message (carrying SCG-Config and DC Handling info) to the master node control plane 250 at operation 328. The secondary node addition request acknowledgement message may be transmitted before exchanging the RB control request and response messages. The secondary node addition request acknowledgement message may include dual connectivity handling information (DC Handling info) in the case where the type of the bearer to be added is an SCG bearer or an SCG split bearer, i.e., a bearer anchored in the secondary node.

Upon receipt of the secondary node addition request acknowledgement message from the secondary node control plane 260 at operation 318 or 328, the master node control plane 250 may transmit, at operation 330, an RRC connection reconfiguration message including the dual connectivity handling information (DC handling info) to the user terminal 101. Here, the dual connectivity handling information (DC handling info) is generated by the anchored node and transmitted to the terminal. That is, if the type of the bearer requested to be added is an MCG split bearer, i.e., a bearer anchored in the master node, the master node generates the dual connectivity handling information (DC handling info); and if the type of the bearer requested to be added is an SCG bearer or SCG split bearer, i.e., a bearer anchored in the secondary node, the secondary node generates the dual connectivity handling information (DC handling info) and sends the dual connectivity handling information to the master node. In this manner, the master node control plane 250 or the secondary node control plane 260 may instruct the user terminal 101 to configure or reconfigure an RRC for dual connectivity (e.g., dual connectivity bearer type change information, security key change indicator, radio bearer keep/reset information, and reuse protocol type).

Upon receipt of the RRC connection reconfiguration message at operation 330, the user terminal 101 may maintain, rather than reset, the bearer in use for communication with the old master node based on the dual connectivity handling information included in the RRC connection reconfiguration message. The user terminal 101 may generate an RRC connection reconfiguration complete message and transmit the message to the master node control plane 250 at operation 332.

Upon receipt of the RRC connection reconfiguration complete message at operation 332, the master node control plane 250 may generate a secondary node reconfiguration complete message and transmit the secondary node reconfiguration complete message to the secondary node control plane 260 at operation 334. The secondary control plane 260 and the user terminal 101 may perform a random access procedure at operation 336. The random access procedure may be skipped for the case where the secondary node and the terminal are connected to each other, i.e., if the secondary node and the terminal are in the RRC connected state, or performed for the case where the secondary node and the terminal are not connected to each other, i.e., if the secondary node and the terminal are in the RRC idle state. If the type of the bearer requested to be added is a MCG split bearer, i.e., a bearer anchored in the master node, operation 340 is performed; and if the type of the bearer requested to be added is an SCG bearer or SCG split bearer, i.e., a bearer anchored in the secondary node, operation 350 is performed. First, operation 340 is described.

In the case of the bearer anchored in the master node, the master node control plane 250 may generate an RB resume request message requesting for resuming the corresponding bearer and transmit the RB resume request message to the common anchored user plane 240 at operation 342 after transmitting the secondary node reconfiguration complete message. In the case where the type of the bearer requested to be added is an SCG bearer or SCG split bearer, i.e., a bearer anchored in the secondary node, the secondary node control plane 260 may generate an RB resume request for resuming the corresponding bearer, upon receipt of the secondary node reconfiguration complete message, and transmit the RB resume request message to the common anchored user plane 240 at operation 352.

Upon receipt of the RB resume request message, the common anchored user plane 240 may perform user data communication with the user terminal 101 through the old bearer that has been used for communication with the terminal 101. Because the common anchored user plane 240 has received the RB resume request message from the secondary node control plane 260, it may generate an RB resume response message and transmit the RB resume response message to the master node control plane 250 at operation 344 or to the secondary node control plane 260 at operation 354.

Introducing the common anchored user plane 240 between the master node and the secondary node makes it possible to omit the sequence number (SN) status transfer and data forwarding operations that are subsequently performed between the master and secondary nodes in the legacy procedure.

Afterward, if necessary (e.g., if the transport layer address or DL GTP TEID is changed), the master node control plane 250 may perform a path update procedure with an access and mobility management function (AMF) 40 at operation 360 (if the anchor point is changed). Here, the AMF may be implemented as a network entity responsible for the corresponding function.

Meanwhile, operation 360 may also be omitted with the introduction of the common anchored user plane 240. If it is necessary to notify the AMF entity 40 of the change of the bearer for transmitting user data, the master node control plane 250 may transmit an E-RAB modification indication message at operation 360.

If the master node control plane 250 transmits an E-RAB modification indication message to the AMF entity 40, the AMF entity 40 may perform a bearer modification procedure with a user plane function (UPF) entity and a session management function (SMF) entity. The UPF entity and the SMF entity may transmit an end marker packet to the common anchored user plane 240. In this manner, the common anchored user plane 240 may terminate communication on the old bearer for bearer modification and resume communication with the user terminal 101 on the modified bearer. The AMF entity 40 may transmit an E-RAB modification confirmation message to the master node control plane 250 at operation 326.

If the master node control plane 250 transmits the E-RAB modification indication message to the AMF entity 40, the AMF entity 40 performs a path update procedure on the bearer allocated to the user terminal 101 via the common anchored user plane 240 based on the information received from the master node control plane 250.

As a consequence, a bearer is established between the common anchored user plane 240 and the UPF/SMF 30 at operation 362*a*, and a bearer is established between the common anchored user plane 240 and the user terminal 101 at operation 362*b*. In the case where there is an MCG split bearer or SCG split bearer, a split bearer may be established at operation 362*c*. Accordingly, the user terminal 101 may communicate user data (MCG bearer or Legacy bearer type, SCG bearer type, SCG Split bearer type or MCG Split bearer type) with the UPF/SMF 30 through the bearers established at operations 362*a* and 362*b* or the bearer established at operations 362*a* and 362*c*.

The AMF and UPF/SMF are defined based on typical core functions, and it should be noted that the proposed method is not limited to a core type of a specific communication technology.

Descriptions are made hereinafter of the proposed intra-master node handover procedure with secondary node configuration with reference to FIGS. 4A and 4B.

Figure 4A:
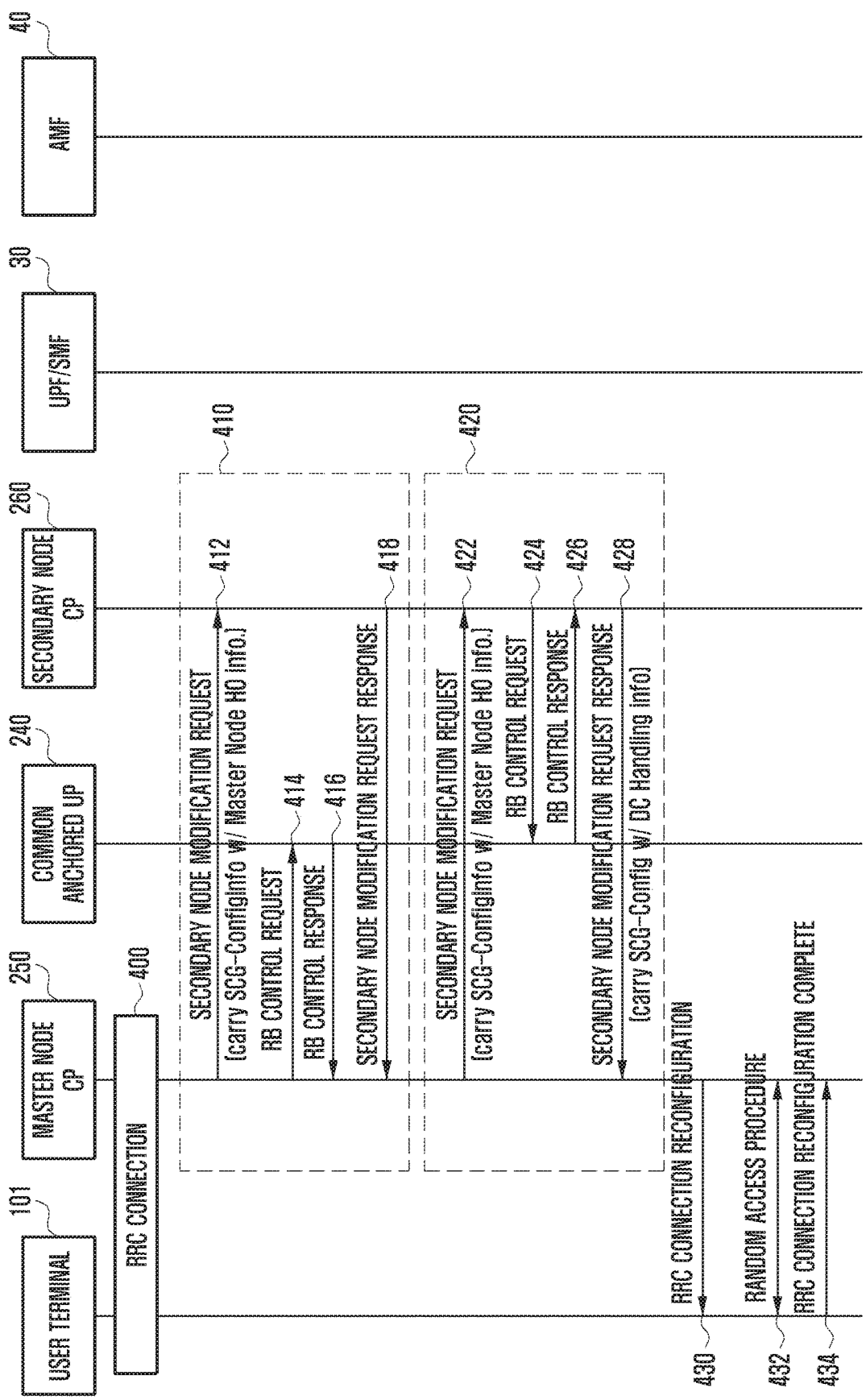
FIGS. 4A and 4B are a signal flow diagram illustrating an intra-master node handover procedure with secondary node configuration according to a disclosed embodiment.
Figure 4B:
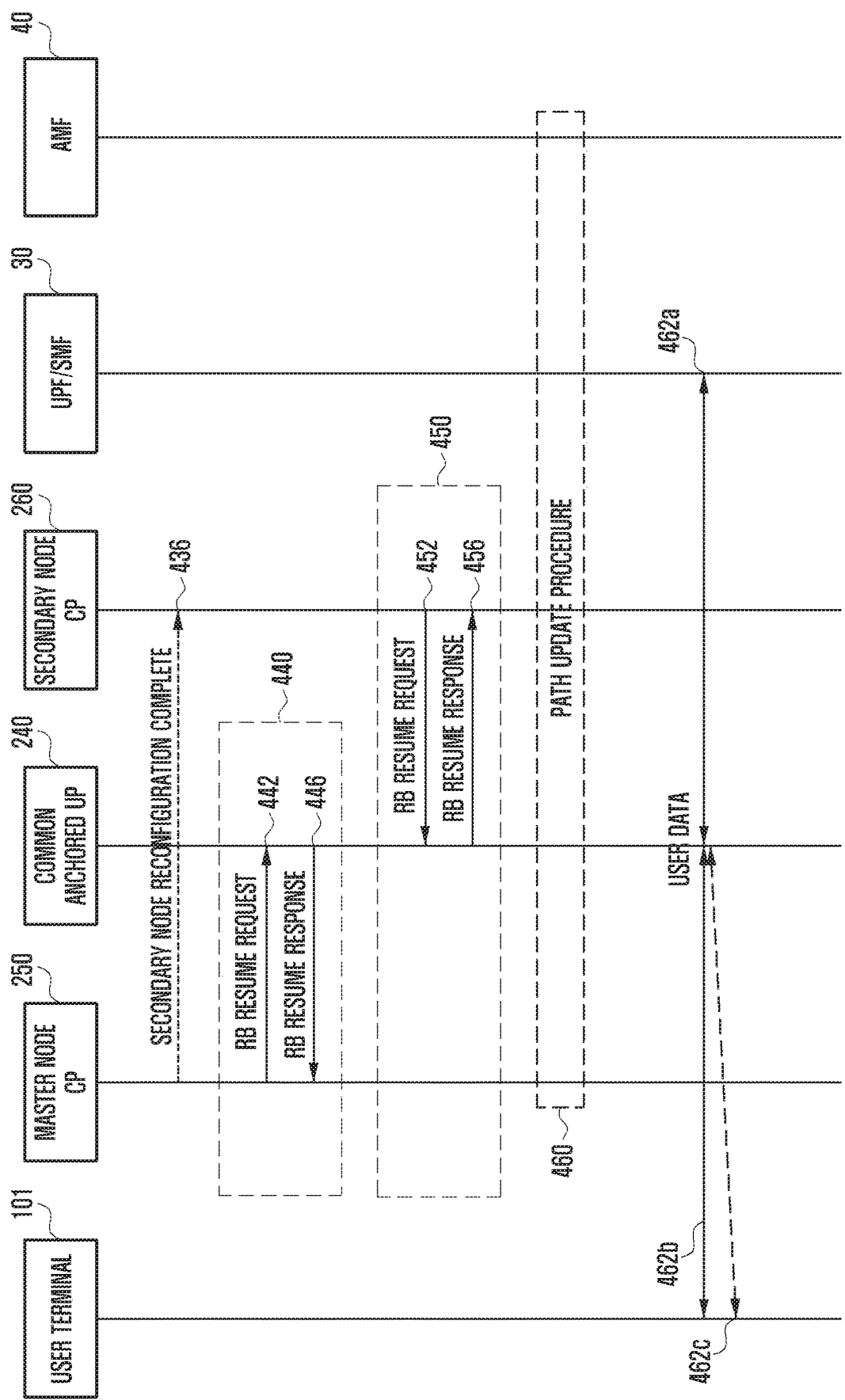

FIGS. 4A and 4B are signal flow diagrams illustrating an intra-master node handover procedure with secondary node configuration according to a disclosed embodiment.

The signal flows in FIG. 4A are followed by the signal flows in FIG. 4B. That is, because the procedure includes too many signal flows to be depicted in a single diagram, it has been depicted as two separated diagrams. In the following description, FIGS. 4A and 4B may be collectively referred to as FIG. 4 unless they need to be distinguished. In FIG. 4, the same reference numbers used in the above description are used to refer to the same network entities such as the user terminal 101 and the master node control plane 250.

FIG. 4 shows an inter-master node handover procedure for handing over the terminal 101 connected to the first base station 101 as the master node base station and the third base station 131 as a secondary node from the first base station 101 to the second base station 121 sharing the master node control plane.

The terminal 101 may be connected, i.e., in the RRC connected state, to the first base station 111 and simultaneously connected, i.e., in the RRC connected state, to the third base station 131 (not shown) as a base station of the secondary node control plane 260 at operation 400. This may be the case where the terminal 101 receiving user data from the master node control plane 250 via the common anchored user plane 240 connects to the third base station 131 as the secondary node. As described with reference to FIG. 1C, the master node base station change may be shown as an intra-node handover from the viewpoint of the master node control plane 250.

In the case where the user terminal 101 moves as shown in FIG. 1C, the master node control plane 250 may need information from the user terminal 101, e.g., signal strength information of the second base station 121 or a handover request from the second base station 121. In this case, the master node control plane 250 has to perform a procedure to maintain the bearer established in the common anchored user plane 240 used in common with the third base station 131 as the secondary node. At operation 412 or 422, the master node 250 transmits to the secondary node control plane 260 a secondary node modification request message (carrying SCG-ConfigInfo and Master Node HO info.) including master node information including information indicative of a handover (e.g., target control plane TEID/IP address and handover type) and information for configuring a bearer in use in the old common anchored user plane 240 (e.g., dual connectivity bearer type change information, security key, security key change indicator, and reuse protocol type).

In the case where the type of the bearer requested to be added is an MCG split bearer, i.e., a bearer anchored in the master node, operation 410 is performed; and in the case where the type of the bearer requested to be added is an SCG bearer or an SCG split bearer, i.e., a bearer anchored in the secondary node, operation 420 is performed. Here, operation 412 and operation 422 may be identical with each other.

In the case where the type of the bearer requested to be added is an MCG split bearer, i.e., a bearer anchored in the master node, if necessary (e.g., configuration change of the old bearer), the master node control plane 250 may transmit an RB control request message to the common anchored user plane 240 at operation 414. In the case where the type of the bearer requested to be added is an SCG bearer or an SCG split bearer, i.e., a bearer anchored in the secondary node, if necessary (e.g., configuration change of the old bearer), the secondary node control plane 260 may transmit the RB control request message to the common anchored user plane 240 at operation 424.

On the basis of the RB control request message received at operation 414 or 424, the common anchored user plane 240 may change configuration on the bearer it has previously allocated to the user terminal 101. Afterward, the common anchored user plane 240 may transmit an RB control response message to the master node control plane 250 or the secondary node control plane 260.

If necessary, the secondary node control plane 260 may transmit a secondary node addition request acknowledgement message (carrying SCG-Config and DC Handling info) including dual connectivity handling information (DC handling info) to the master node control plane 250 at operation 418 or 428. Here, the dual connectivity handling information (DC handling info) is generated by the anchored node and transmitted to the terminal at operation 418. That is, if the type of the bearer requested to be added is an MCG split bearer, i.e., a bearer anchored in the master node, the master node control plane 250 generates the dual connectivity handling information (DC handling info); and if the type of the bearer requested to be added is an SCG bearer or SCG split bearer, i.e., a bearer anchored in the secondary node, the secondary node control plane 260 generates the dual connectivity handling information (DC handling info) and sends the dual connectivity handling information to the master node control plane 250. Accordingly, on the basis of the received secondary node addition request acknowledgement message, the master node control plane 250 may transmit an RRC connection reconfiguration message including the dual connectivity handling information (DC Handling info) to the user terminal 101 at operation 430.

At operation 432, the user terminal 101 may perform a random access procedure with the master node control plane 250. The random access procedure may be performed with the second base station 121 as a handover target base station as exemplified with reference to FIG. 1C. Upon completion of the random access procedure, the user terminal 101 may generate an RRC connection reconfiguration complete message and transmit the message to the master node control plane 250 at operation 434. Here, the random access procedure may be omitted by maintaining, rather than resetting, the bearer established to the secondary node based on the dual connectivity handling information (DC handling info).

After receiving the RRC connection reconfiguration complete message at operation 432, if necessary, the master node control plane 250 may transmit a secondary node reconfiguration complete message to the secondary node control plane 260 at operation 436.

At operation 442 or 452, the secondary node control plane 260 may transmit an RB resume request message to the common anchored user plane 240 for resuming the bearer. As described above, operations 440 and 450 may correspond to operations being performed, respectively, when the type of the bearer is the MCG split bearer and when the type of the bearer is the SCG bearer or SCG split bearer.

The RB resume request message for resuming the bearer may be transmitted in the case where the user terminal 101 uses a split bearer for connection to both a master node base station and a secondary node base station. Meanwhile, in the case of using the SCG bearer, operations 452 and 456 for transmitting and receiving the radio bearer resume request and response messages may be omitted.

Upon receipt of the RB resume request message at operation 442 or 452, the common anchored user plane 240 may determine to resume the service that has been provided through the bearer established previously in the common anchored user plane 240 and generate and transmit an RB resume response message to the secondary node control plane 260 or the master node control plane 250 at operation 446 or 456.

Introducing the common anchored user plane 240 between the master node and the secondary node makes it possible to omit the sequence number (SN) status transfer and data forwarding operations that are subsequently performed between the master and secondary nodes in the legacy procedure.

Afterward, if necessary, the master node control plane may perform a path update procedure (if anchor point is changed) at operation 460 to notify a serving gateway 10 of the bearer change in the common anchored user plane 240. In the case where no path change is necessary in the common anchored user plane, the corresponding procedure may be omitted. In FIG. 4, the path update procedure is performed with the AMF 40.

In the case of the MCG bearer or legacy bearer, a bearer (not shown) is established for data communication between the common anchored user plane 240 and the secondary node control plane, or a bearer is established between the common anchored user plane 240 and the UPF/SMF 30 at operation 462a and a bearer is established between the common anchored user plane 240 and the user terminal 101 at operation 462b. In the case where there is an MCG split bearer or SCG split bearer, a split bearer may be established between the common anchored user plane 240 and the user terminal 101 at operation 362c. Accordingly, the user terminal 101 may communicate user data (MCG bearer or Legacy bearer type, SCG bearer type, SCG Split bearer type or MCG Split bearer type) with the UPF/SMF 30 through the bearers established at operations 462a and 462b or the bearers established at operations 462a and 462c.

Figure 5A:
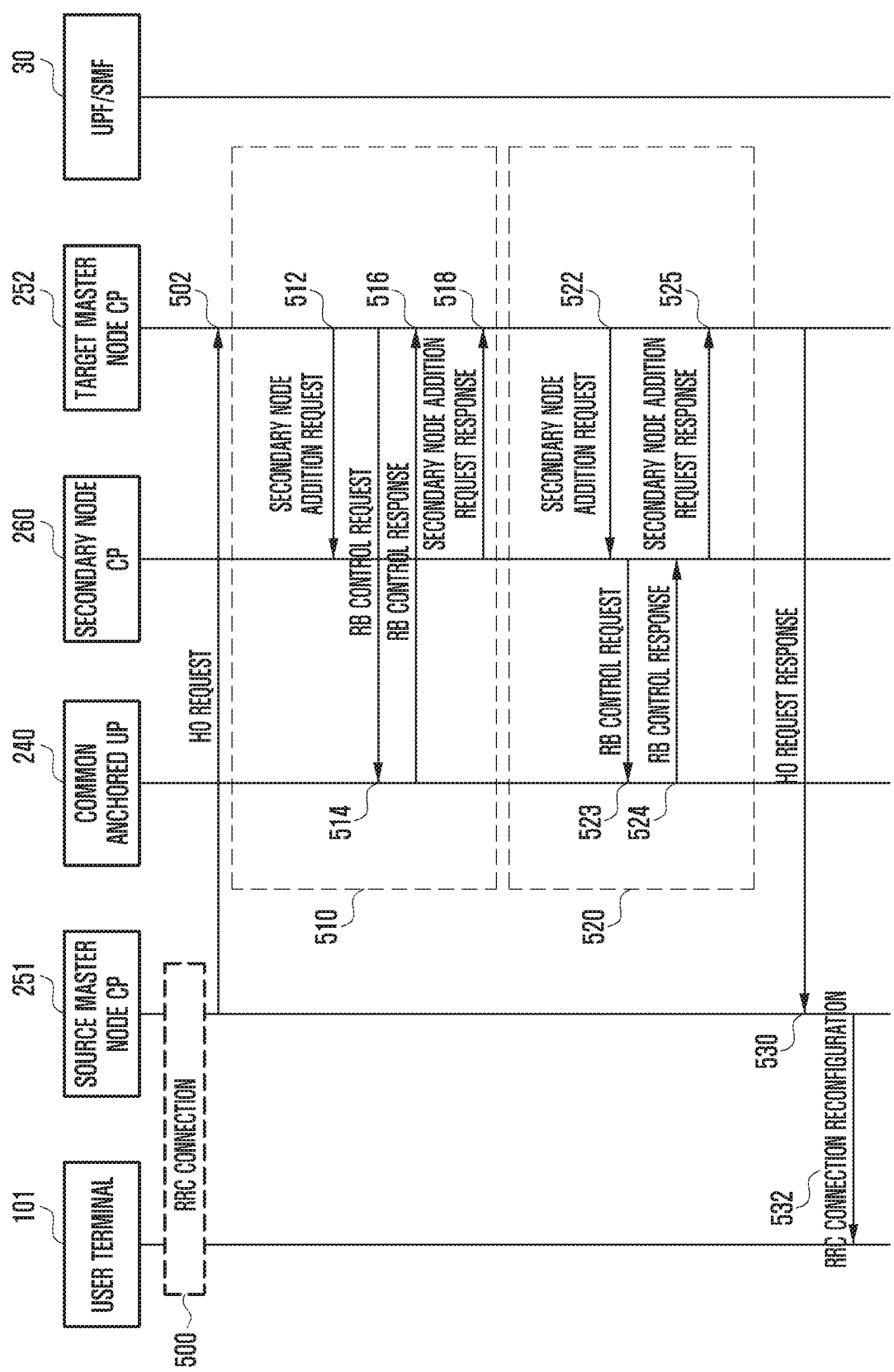
FIGS. 5A and 5B are a signal flow diagram illustrating an inter-master node handover procedure without changing a secondary node according to a disclosed embodiment.
Figure 5B:
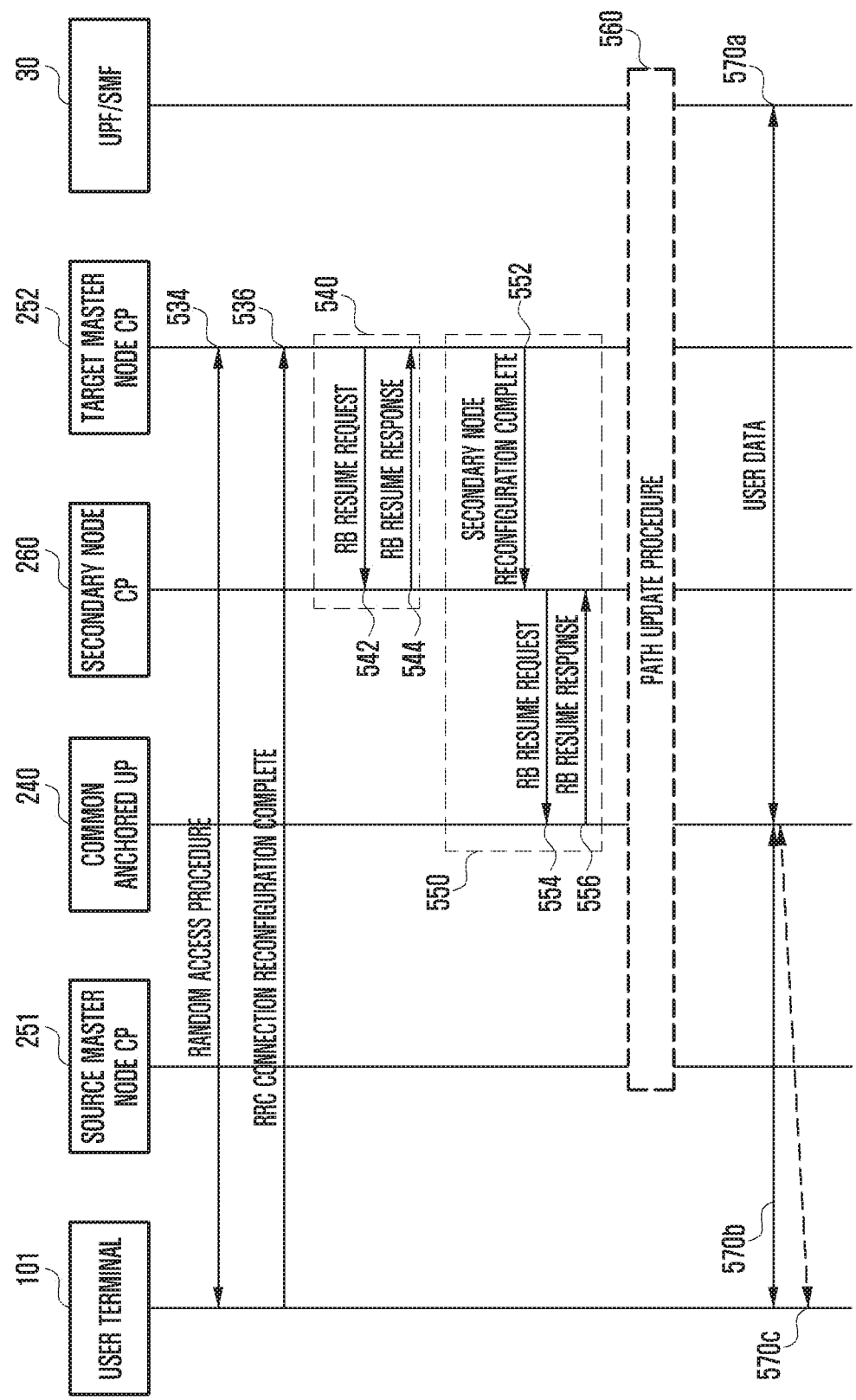

FIGS. 5A and 5B are signal flow diagrams illustrating an inter-master node handover procedure without changing a secondary node according to a disclosed embodiment.

The signal flows in FIG. 5A are followed by the signal flows in FIG. 5B. That is, because the procedure includes too many signal flows to be depicted in a single diagram, it has been depicted as two separated diagrams. It may occur that different master node control planes exist. In reference to FIG. 1C, this is the case where the first base station 111 and the second base station 121 have different master node control planes and the third base station 131 has one of connections in dual connectivity. A description is made of the signal flows in a situation of performing a handover of a terminal in the dual connectivity mode with reference to FIGS. 5A and 5B. In the following description, FIGS. 5A and 5B may be collectively referred to as FIG. 5, unless they need to be distinguished.

In reference to FIG. 5A, the user terminal 101 may be in an RRC connected state to a source master node control plane 251. Here, the source master node control plane 251 may be the master node control plane of the first base station 111 as described above. Here, it may become necessary to hand over the terminal 101 to another base station based on a request or received signal strength information from the user terminal 101. Here, the received signal strength information may include signal strength information of a neighboring base station as well as the signal strength information of the base station included in the source master node control plane 251. The handover may be triggered by the terminal or determined autonomously by the base station. In the disclosed embodiments, no restriction is put on the entity triggering the handover.

Unlike the embodiment of FIGS. 2A and 2B in which the master node control plane 250 manages different master node radio communication units 210 and 220, the master node control plane is changed in the embodiment of FIGS. 5A and 5B. In this regard, the master node control plane is divided into a source master node control plane 251 and a target master node control plane 252. Even in this case, the common anchored user plane 240 may be shared. On the basis of such assumptions, a description is made of the procedure for maintaining a bearer assigned between the terminal and a secondary node in the common anchored user plane 240 during an inter-master node handover according to a disclosed embodiment.

In reference to FIG. 5A, the source node control plane 251 may transmit, at operation 502, to the target master node control plane 252 a handover request message including user plane information (anchored UP information) of the bearer assigned to the terminal for an inter-master node handover. The user plane information (anchored UP information) of the bearer assigned to the terminal for moving the old bearer to a counterpart control plane that is transmitted at operation 502 may include a GTP tunnel endpoint identifier (UP GTP TEID and IP ad. dress). The user plane information may also include information on the old security key in use with the current bearer or a new security key and a security key change indicator. Upon receipt of the handover request, the target node control plane 252 may perform one of processes 510 and 520. Process 510 may include signal flows for the case of using an MCG split bearer, and process 520 may include signal flows for the case of using an SCG bearer/SCG split bearer. MCG is an abbreviation for master cell group and denotes a group of cells being managed by a unit of a master node. Likewise, SCG is an abbreviation for secondary cell group and denotes a group of cells being managed by a unit of a secondary node.

At operation 512 of process 510 or operation 522 of process 520, the target master node control plane 252 may transmit to the secondary node control plane 260 a secondary node addition request message including master node handover information (Master Node HO info) based on the handover information received from the source master node and the bearer information of the user plane.

The master node information may include information indicating the handover (e.g., target control plane TEID/IP address and handover type) and information for configuring a bearer being managed in the old common anchored user plane 240 (e.g., dual connectivity bearer type change information, security key, security key change indicator, and reuse protocol type).

In the case where the type of the bearer is an MCG split bearer, i.e., a bearer anchored in the master node, the target master node control plane 252 may transmit an RB control request message to the common anchored user plane 240 at operation 514. In the case where the type of the bearer is an SCG bearer or SCG split bearer, i.e., a bearer anchored in the secondary node, the secondary node control plane 260 may transmit the RB control request message to the common anchored user plane 240 at operation 524.

In the case where the type of the bearer is an MCG split bearer, the common anchored user plane 240 may receive the RB control request message at operation 514 and, if the RB control request message includes a keep indicator, it may skip bearer resetting to maintain the bearer assigned to the user terminal 101 being managed in the common anchored user plane 240 rather than reset the bearer and transmit an RB control response message to the target master node control plane 252 at operation 516. In the case where the type of the bearer is an SCG bearer or SCG split bearer, the common anchored user plane 240 may receive the RB control request message at operation 524 and, if the RB control request message includes a keep indicator, it may skip bearer resetting to maintain the bearer assigned to the user terminal 101 and generate and transmit an RB control response message to the secondary node control plane 260 at operation 526.

Afterward, in the case where the type of the bearer is an MCG split bearer, i.e., a bearer anchored in the master node, the master node generates dual connectivity handling information (DC handling info); and in the case where the type of the bearer is an SCG bearer or SCG split bearer, i.e., a bearer anchored in the secondary node, the secondary node may generate the dual connectivity handling information (DC handling info) and create and transmit a secondary node addition request acknowledgement message including the dual connectivity handling information (DC handling info) to the target master node control plane 252 at operation 518.

Once the process 510 or 520 is completed, the target master node control plane 252 may generate and transmit, at operation 530, a handover request acknowledgement message including the dual connectivity handling information (DC handling info) to the source master node control plane 251.

At operation 532, the source master node control plane 251 may generate and transmit an RRC connection reconfiguration message including the dual connectivity handling information (DC handling info) to the user terminal 101.

Hereinafter, subsequent operations are described with reference to FIG. 5B. In reference to FIG. 5B, upon receipt of the RRC connection reconfiguration message at operation 532, the user terminal 101 may skip bearer reset to maintain the corresponding bearer based on the dual connectivity information included in the received message and perform a random access procedure with the target master node control plane 252 at operation 534. If the random access procedure with the target maser node control plane 252 is completed at operation 534, the user terminal 101 may generate and transmit an RRC connection reconfiguration complete message to the target master control plane 252 at operation 536.

Upon receipt of the RRC connection reconfiguration complete message at operation 536, the target master node control plane may perform process 540 for the case where the MCG split bearer is requested as described above and process 550 for the case where the SCG bearer/SCG split bearer is requested.

In process 540, the target master node control plane may generate and transmit an RB resume request message to the secondary node control plane 260 at operation 542. The secondary node control plane 260 may receive the RB resume request message at operation 542 and, if the RB resume request message includes a resume indicator, it may resume the radio bearer and generate and transmit an RB resume response message to the target master node control plane 252 at operation 544.

In the case where an SCG bearer/SCG split bearer is requested, the target master node control plane may generate and transmit a secondary node reconfiguration complete message to the secondary node control plane 260 at operation 552. Then, the secondary node control plane 260 may generate and transmit an RB resume request message to the common anchored user plane 240 at operation 554. The common anchored user plane 240 may receive the RB resume request message at operation 554 and, if the RB resume request message includes a resume indicator, it may resume the radio bearer and generate and transmit an RB resume response message to the secondary node control plane 260 at operation 556.

Introducing the common anchored user plane 240 between the master node and the secondary node makes it possible to omit the SN status transfer and data forwarding operations that have been necessary between the master node and the secondary node in the legacy procedure.

After the above operation is completed, if necessary, the target master node control plane 252 may perform, at operation 560, a path update procedure (if anchor point is changed) to provide notification that the bearer assigned to the user terminal 101 is changed in the common anchored user plane 240 via an AMF. Here, a user plane function (UPF) and a session management function (SMF) may be included in the control plane as two separate functions and may be implemented as a single network entity as described above.

If the bearer configuration is changed as above, a bearer is established between the UPF/SMF 30 and the common anchored user plane 240 at operation 570a, and a bearer is established between the common anchored user plane 240 and the user terminal 101 at operation 570b. In the case of using a split bearer, the split bearer is established between the common anchored user plane 240 and the user terminal 101 at operation 570c. Accordingly, the user terminal 101 may communicate user data (MCG bearer or Legacy bearer type, SCG bearer type, SCG Split bearer type or MCG Split bearer type) with the UPF/SMF 30 through the bearers established at operations 570a and 570b or the bearers established at operations 570a and 570c.

Figure 6A:
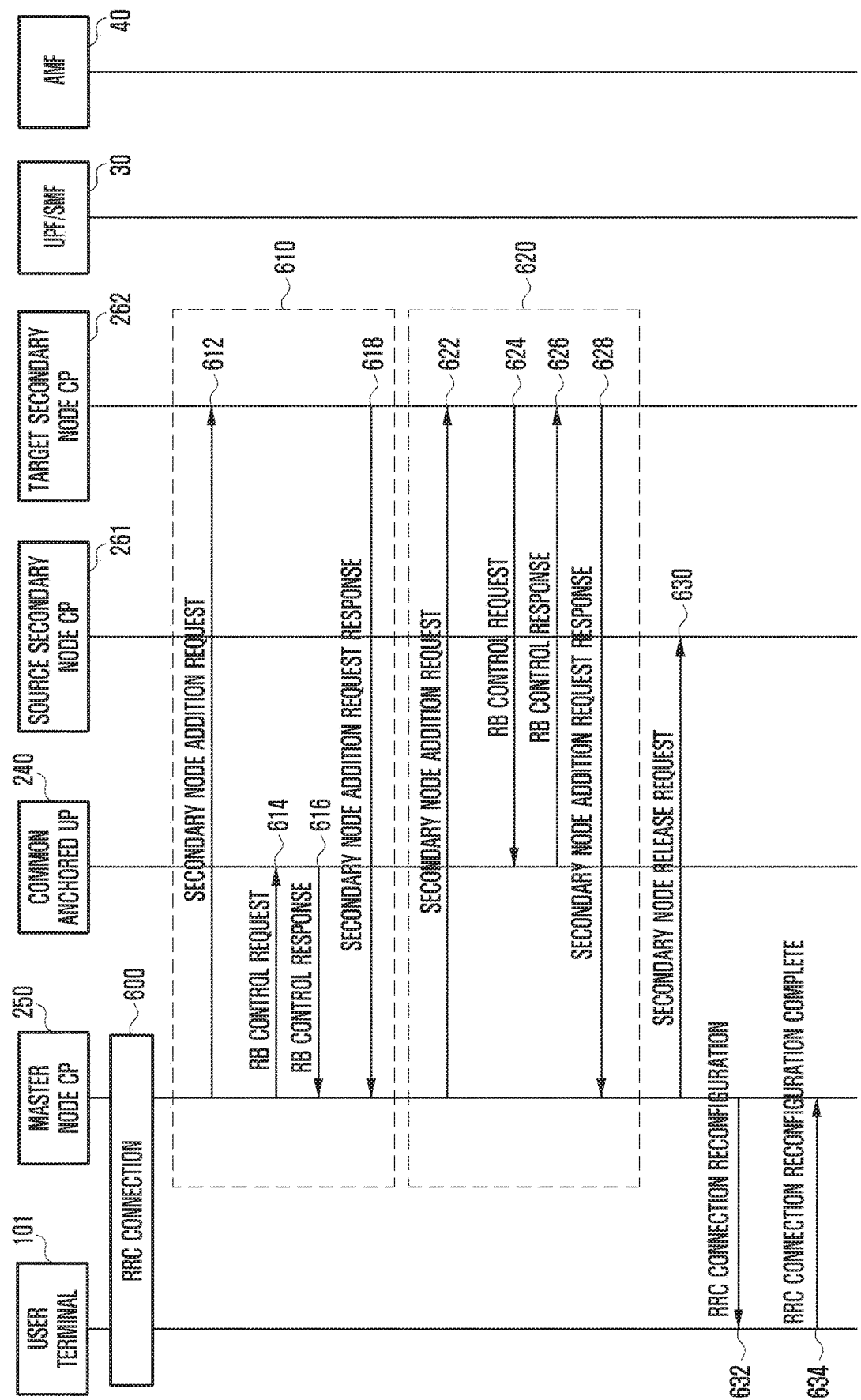
FIGS. 6A and 6B are a signal flow diagram illustrating a secondary node change procedure according to an disclosed embodiment.
Figure 6B:
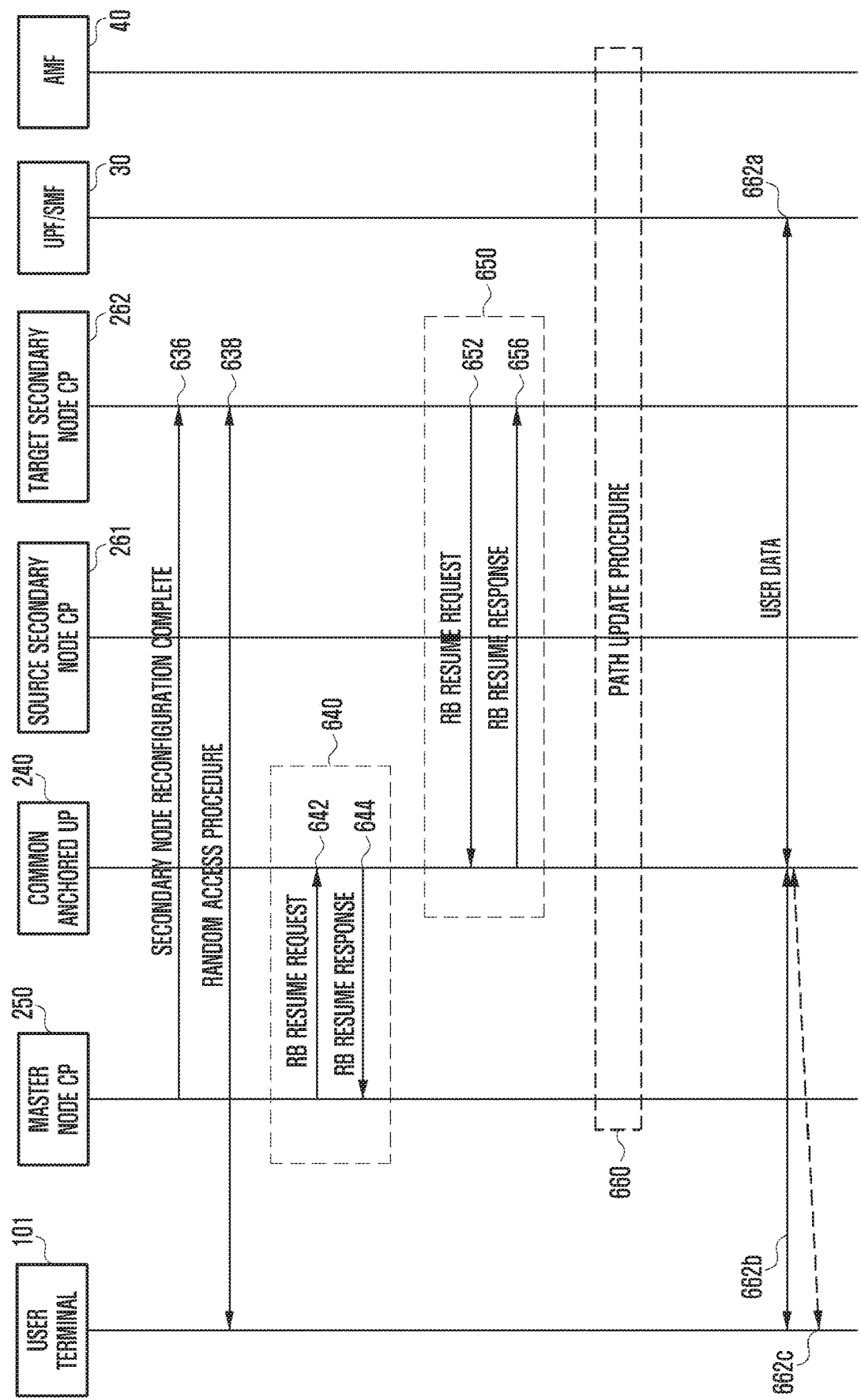

FIGS. 6A and 6B are signal flow diagrams illustrating a secondary node change procedure according to a disclosed embodiment.

The user terminal 101 in the dual connectivity mode may be connected, i.e., in the RRC connected state, to the first base station 101 as a master node base station and simultaneously connected i.e., in the RRC connected state, to the third base station 131 (not shown) as a secondary node base station. The following description is directed to signal flows in the case where the user terminal 101 connected to the first base station 101 as the master node base station and the third base station 131 as the secondary node, the secondary node changes from the third base station to another base station. In the following description, the secondary control plane is divided into a source secondary control plane 261 and a target secondary control plane 262. Here, a secondary radio communication unit being managed by the source secondary control plane 261 and another secondary radio communication unit being managed by the target secondary control plane 261 may be located at different locations and controlled separately.

As described above, all secondary cell base stations operating as secondary nodes may share the common anchored user plane 240 in the disclosure. According to a disclosed embodiment, the control plane of two or more secondary cell base stations may be shared for use. That is, multiple secondary node radio communication units 230, which are described with reference to FIG. 2A, may be configured and share the common anchored user plane 240 under the control of multiple secondary node control planes 260. This may be understood as that the master node first radio communication unit 210 and the master node second radio communication unit 220, which are described with reference to FIG. 2A, are shared to process user data in the common anchored user plane 240 under the control of one or more master node control planes 250.

It should be noted that FIGS. 6A and 6B depict a single flowchart that is too large to be presented as a single drawing. In the following description, FIGS. 6A and 6B may be collectively referred to as FIG. 6 unless they need to be distinguished. A signal processing procedure for changing the secondary node is described with reference to FIG. 6. According to an disclosed embodiment, the user terminal 101 changes its connection from a cell formed with a specific secondary node radio communication unit (i.e., source secondary node or cell) to a cell formed with a secondary node radio communication unit (i.e., target secondary node or cell) in the secondary node control plane 260. This may correspond to a procedure in which the common anchored user plane 240 maintains the bearer assigned to the user terminal 101 and resumes the data service after the cell change has been completed.

It may occur that the master node control plane 250 detects a necessity of changing the third base station 131 as the secondary node or cell based on information, e.g., signal strength information of the third base station 131 as the secondary node, from the user terminal 101. In this case, the master node control plane 250 may determine to change a cell of the secondary node. As a consequence, the master node control plane 250 may generate and transmit a secondary node addition request signal to the target secondary node control plane 262 at operation 612 or 622. In order to move the old bearer to a counterpart control plane at operation 612 or 622, the user plane information (Anchored UP Information) of the bearer assigned to the corresponding terminal may include a GT tunnel endpoint identifier (UP GTP TEID and IP address). The information may also include old security key information in use on the current bearer or new security key information and a security key change indicator. Although not shown in the drawing, if necessary, the source secondary node control plane 261 may autonomously determine to perform cell change to the cell of the target secondary node based on the signal strength information of the third base station 131 as the source secondary node. In this case, the secondary node control plane 260 may first transmit a change request (e.g., "Secondary node change required") to the master node control plane 250, which is followed by a basic procedure similar to that of FIG. 6.

Afterward, the secondary node control plane 262 may transmit an RB control request message to the common anchored user plane 240 at operation 624. Here, the RB control request message may be transmitted from the target secondary node control plane 262 to the common anchored user plane 240 for the case where the type of the bearer is an SCG bearer or SCG split bearer, i.e., a bearer anchored in the secondary node or from the master node control plane 250 to the common anchored user plane 240 at operation 614 for the case where the type of the bearer is an MCG split bearer, i.e., a bearer anchored in the master node, as shown in FIG. 6.

The common anchored user plane 240 receives the RB control request message at operation 614 or 624 and, if the RB control request message includes a keep indicator, it may skip a releasing operation to maintain the bearer assigned to the terminal 101 in the old common anchored user plane 240. If necessary, the common anchored user plane 240 may change the association target from the old source secondary node control plane 261 to the target secondary node control plane 262. The common anchored user plane 240 may maintain the bearer assigned to the terminal 101 and, if the bearer is an SCG bearer or SCG split bearer, i.e., a bearer anchored in the secondary node, it may change the association target from the source secondary node control plane 261 to the target secondary node control plane 262. Afterward, the target secondary node control plane 262 may transmit an RB control response message to the target secondary node control plane 262 at operation 626 or to the master node control plane 250 at operation 616.

In FIG. 6, in the case where the RB control request message is transmitted from the target secondary node control plane 262 to the common anchored user plane 240 at operation 624, the RB control response message is transmitted from the common anchored user plane 240 to the target secondary node control plane 262 at operation 626. Meanwhile, in the case where the RB control request message is transmitted from the master node control plane 250 to the common anchored user plane 240 at operation 614, the RB control response message is transmitted from the common anchored user plane 240 to the master node control plane 250 at operation 616.

If the master node control plane 250 or the secondary node control plane 260 receives the RB control response message at operation 616 or 626 from the common anchored user plane 240, it may be considered that the corresponding bearer is successfully set up in the common anchored user plane 240.

Upon receipt of the RB control response message, if necessary, the secondary node control plane 260 may transmit a secondary node addition request acknowledgement message to the master node control plane 250 at operation 618 or 628. The secondary node addition request acknowledgement message may be transmitted before exchanging the RB control request and response messages. The secondary node addition request acknowledgement message may include dual connectivity handling information (DC Handling info). The dual connectivity handling information (DC Handling info) may be generated by an anchored node and transmitted to the user terminal 101. That is, the dual connectivity handling information (DC handling info) is generated by the master node control plane 250 in the case where the type of the bearer requested to be added is an MCG split bearer, i.e., a bearer anchored in the master node, or by the secondary node in the case where the type of the bearer requested to be added is an SCG bearer or SCG split bearer, i.e., a bearer anchored in the secondary node and transmitted to the master node.

Upon receipt of the secondary node addition request acknowledgement message from the target secondary node control plane 262 at operation 618 or 628, the master node control plane 250 may generate and transmit a secondary node release request message to the source secondary control plane 261 at operation 630. In this manner, the call control of the source secondary node control plane to the user terminal 101 may be released.

At operation 632, the master node control plane 250 may transmit to the user terminal 101 an RRC connection reconfiguration message including dual connectivity handling information (DC handling info). In this manner, the master node control plane 250 may instruct the user terminal 101 to configure or reconfigure RRC connections (e.g., dual connectivity bearer type change information, security key change indicator, radio bearer keep/reset information, and reuse protocol type) for dual connectivity. That is, the master node control plane 250 may instruct the user terminal 101 to perform RRC configuration or reconfiguration with a base station of another secondary node.

Upon receipt of the RRC connection reconfiguration message at operation 632, the user terminal 101 may not perform any reset to maintain the old bearer based on the dual connectivity handling information included in the RRC connection reconfiguration message. The user terminal 101 may generate and transmit an RRC connection reconfiguration complete message to the master node control plane 250 at operation 634.

Upon receipt of the master node control plane 250 at operation 634, the master node control plane 250 may generate and transmit a secondary node reconfiguration complete message to the target secondary node control plane 262 at operation 636. The user terminal 101 and the target secondary node control plane 262 perform a random access procedure at operation 638. In the case where the type of the bearer is an SCG bearer or SCG split bearer, i.e., a bearer anchored in the secondary node, the secondary node control player 260 may generate and transmit an RB resume request message to the common anchored user plane 240 at operation 642 of process 640 after the random access procedure has been completed. In the case where the type of the bearer is an MCG split bearer, i.e., a bearer anchored in the master node, the master node control plane 250 may generate and transmit an RB resume request message to the common anchored user plane 240 at operation 652 of process 650.

Upon receipt of the RB resume request message, the common anchored user plane 240 may resume user data communication with the user terminal 101 through the old bearer used for communication with the terminal 101. In response to the RB resume request message received from the master control plane 250 or the target secondary control plane 262, the common anchored user plane 240 may generate and transmit an RB resume response message to the master node control plane 250 at operation 644 or the target secondary node control plane at operation 656.

Introducing the common anchored user plane 240 between the master node and the secondary node makes it possible to omit the SN status transfer and data forwarding operations that have been necessary between the master node and the secondary node in the legacy procedure.

Afterward, if necessary, the master node control plane 250 may perform a path update procedure at operation 660. Meanwhile, if it is not necessary to change the path in the common anchored user plane, the corresponding procedure may be omitted. That is, if it is necessary to notify the change of the bearer for transmitting user data to a mobility management entity (MME) 20, the master node control plane 250 may transmit an E-RAB modification indication message at operation 620.

The path update procedure may correspond to operations 320 to 326 in FIG. 3. Thus, a detailed description thereof is omitted.

Accordingly, in the case of the MCG bearer or legacy bearer, or MCG split bearer or SCG bearer or SCG split bearer, a bearer may be established between the common anchored user plane 240 and the AMF 40 at operation 622*a*, and a bearer may be established between the common anchored user plane 240 and the user terminal 101 at operation 662*b*. In the case of using an MCG split bearer or SCG split bearer, a split bearer may be established between the common anchored user plane 240 and the user terminal 101 at operation 662*c*. Accordingly, the user terminal 101 may communicate user data (MCG bearer or Legacy bearer type, SCG bearer type, SCG Split bearer type or MCG Split bearer type) with the UPF/SMF 30 through the bearers established at operations 662*a* and 662*b* or the bearers established at operations 662*a* and 662*c*.

Figure 7B:
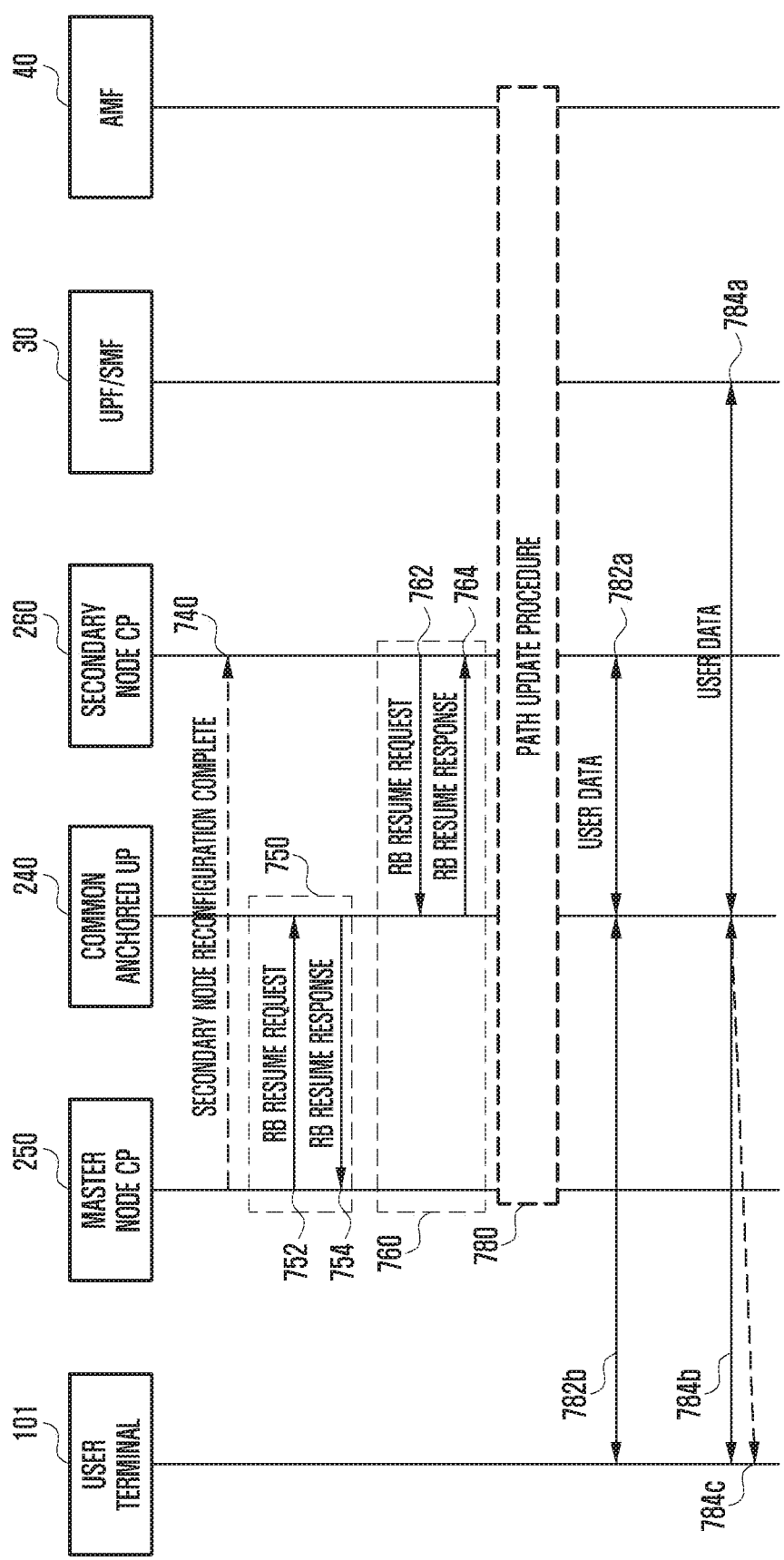

FIGS. 7A and 7B are a signal flow diagram illustrating a procedure for changing a bearer type in dual connectivity according to a disclosed embodiment.

The signal flows in FIG. 7A are followed by the signal flows in FIG. 7B. That is, because the procedure includes too many signal flows to be depicted in a single diagram, it has been depicted as two separated diagrams.

In the following description, FIGS. 6A and 6B may be collectively referred to as FIG. 6 unless they need to be distinguished. FIG. 7 shows signal flows in the case where the bearer type is changed in a master node or a secondary node or between the master and secondary nodes. A description is made of the proposed operations with reference to the accompanying FIG. 7.

In reference to FIG. 7A, the user terminal 101 is in the RRC connected state to the master node control plane 250 at operation 700 and it may also be in the RRC connected state to the second node control plane 260. In FIG. 7A, operation 700 corresponds to the RRC connection state between the user terminal 101 and the master node control plane 250.

If it is necessary to change the bearer type, operation 710 or 720 may be performed. The master node control plane 250 may transmit to the secondary node control plane 260 a secondary node modification request message (carrying SCG-ConfigInfo and Master Node Ho Info.) including dual combativity bearer type change information at operation 712 or 722. This message may be transmitted along with master node handover information (Master Node HO Info.) to deliver the dual connectivity bearer type change information. As shown in FIG. 7A, one of operations 710 and 720 may be selectively used. Operation 710 may be performed in the case of changing from an MCG bearer/MCG split bearer to an SCG bearer/SCG split bearer, and operation 720 may be performed in the case of changing from an SCG bearer/SCG split bearer to an MCG bearer/MCG split bearer.

Accordingly, in the case where a bearer type change is necessary, the master node control plane 250 may transmit to the secondary node control plane 260 the secondary node modification request message including the dual connectivity bearer type change information at operation 712 or 722.

First, descriptions are made of the signal flows subsequent to operation 712 in the case of changing from the MCG bearer/MCG split bearer to the SCG bearer/SCG split bearer. Upon receipt of the secondary node modification request message including the dual connectivity bearer type change information, the secondary node control plane 260 may transmit an RB control request message to the common anchored user plane 240 at operation 714 to change the configuration of the bearer. Upon receipt of information for use in changing the bearer configuration via the RB control request message, the common anchored user plane may change a configuration (e.g., bearer type) of the corresponding user terminal 101 communicating in the old common anchored user plane. Afterward, the common anchored user plane 240 may generate and transmit an RB control response message to the secondary node control plane 260 at operation 716.

In FIG. 7A, the RB control request message is transmitted from the secondary node control plane 260 to the common anchored user plane 240, and the RB control response message is transmitted from the common anchored user plane 240 to the secondary node control plane 260. However, the RB control request message may be transmitted from the master node control plane 250 to the common anchored user plane 240. In this case, the common anchored user plane 240 may transmit the RB control response message to the master node control plane 250.

Afterward, the secondary node control plane 260 may generate and transmit, at operation 718, a secondary node modification request acknowledgement message including dual connectivity handling information (DC handling info) to the master node 250.

Next, descriptions are made of the signal flows in operation 720 for changing from the SCG bearer/SCG split bearer to the MCG bearer/MCG split bearer. As described above, in the case of changing from the SCG bearer/SCG split bearer to the MCG bearer/MCG split bearer, the master node control plane 250 may transmit the RB control request message to the common anchored user plane 240 at operation 724 subsequent to operation 722. Here, the RB control request message may include information on a bearer configuration change, and the common anchored user plane 240 may perform a bearer change to the requested type of bearer.

In this case, the common anchored user plane 240 may change the configuration (e.g., bearer type) of the corresponding user terminal 101 communicating in the old common anchored user plane based on the information received at operation 724 from the master node control plane 250. Afterward, the common anchored user plane 240 may generate and transmit an RB control response message to the master node control plane 250 at operation 726.

Afterward, the secondary node control plane 260 may generate and transmit a secondary node modification request acknowledgement message to the master node 250 at operation 728. Afterward, the master node may generate dual connectivity handling information (DC handling info) and transmit an RRC connection reconfiguration message including the information.

Once the bearer type change and related information are shared among the master node control plane 250, the secondary node control plane 260, and the common anchored user plane 240 as described above, the master node control plane 250 may transmit, at operation 730, an RRC connection reconfiguration message including dual connectivity handling information to the user terminal 101.

Upon receipt of the RRC connection reconfiguration message at operation 730, the user terminal 101 may change the type of the bearer rather than reset the corresponding bearer based on the dual connectivity information included in the received message and generate and transmit an RRC connection reconfiguration complete message to the master node control plane 250 at operation 734.

Hereinafter, subsequent operations are described with reference to FIG. 7B. In reference to FIG. 7B, upon receipt of the RRC connection reconfiguration complete message, if necessary, the master node control plane 250 may generate and transmit a secondary node reconfiguration complete message to the secondary node control plane 260 at operation 740.

Operations 750 and 760 are performed selectively according to the type of the currently configured bearer. That is, operation 750 is performed in the case where the currently configured bearer is an MCG bearer/MCG split bearer, and operation 760 is performed in the case where the currently configured bearer is an SCG bearer/SCG split bearer.

First, descriptions are made of the signal flows in operation 750 being performed in the case where the currently configured bearer is the MCG bearer/MCG split bearer. The master node control plane 250 may generate and transmit, at operation 753, an RB resume request message to the common anchored user plane 240 to resume the bearer. Then, the common anchored user plane 240 may resume user data transmission through the corresponding bearer and generate and transmit an RB resume response message to the master node control plane 250 at operation 754.

Next, descriptions are made of the signal flows in operation 760 being performed in the case where the currently configured bearer is the SCG bearer/SCG split bearer. The secondary node control plane 260 may generate and transmit an RB resume request message to the common anchored user plane 240 at operation 762 to resume the bearer. Then, the common anchored user plane 240 may resume user data transmission through the corresponding bearer and generate and transmit an RB resume response message to the secondary node control plane 260 at operation 764.

Introducing the common anchored user plane 240 between the master node and the secondary node makes it possible to omit the sequence number (SN) status transfer and data forwarding operations that are subsequently performed between the master and secondary nodes in the legacy procedure.

Afterward, if necessary, the master node control plane 250 may perform a path update procedure at operation 780 to notify the change of the corresponding bearer in the common anchored user plane 240 via the AMF 40. In the case where no path update is necessary in the common anchored user plane, the corresponding procedure may be omitted.

Once the path update procedure is completed, a bearer may be generated at operation 782 or 784. At operation 782*a*, a bearer is established between the UPF/SMF 30 and the common anchored user plane 240; at operation 782*b*, a bearer is established between the common anchored user plane 240 and the user terminal 101; and the bearers being established at operation 782 are configured in the case of the type of an MCG bearer, SCG bearer, or legacy bearer.

At operation 784*a*, a bearer is established between the UPF/SMF 30 and the common anchored user plane 240; at operation 784*b*, a bearer is established between the common anchored user plane 240 and the user terminal 101; and the bearers being established at operation 784 are configured in the case of using an MCG split bearer or SCG split bearer. The split bearer established at operation 784*c* between the common anchored user plane and the user terminal 101 may be included also in the case of using an MSG split bearer or SCG split bearer.

Table 1 summarizes the master node handover information (Master Node HO info), dual connectivity handling information (DC Handling Info), and RB control request, resume, and response messages aforementioned.

TABLE 1

| Message/Element name | Direction | Description |
| --- | --- | --- |
| Anchored UP Information | Master Node→Secondary Node or Master Node | When a master node requests to a secondary node for secondary node addition, when a source master node requests to a target master node for handover, when a secondary node is changed, or when a master node requests to a target secondary node for a secondary node addition, this anchored UP information is transmitted in a signaling message to provide basic information on the bearer assigned to a UE in an anchored UP. |
| Master Node HO Information | Master Node→Secondary Node | When performing a master node handover or a dual connectivity bearer type change, this master node HO information is transmitted in a signaling message to deliver configuration information of the dual connectivity bearer and handover information. |
| DC Handling Information | Master or Secondary Node→UE | This DC handling information is generated by a master or secondary node and, when a UE operates in dual connectivity, transmitted in a signaling message to maintain or reset old bearers connected to the master or secondary node. |
| RB Control Request/Response | Master or Secondary Node←→Common UP | The request message is generated by the master or secondary node and, when DC is activated in the common anchored UP, this RB control request/response message is transmitted in a signaling message to maintain or reset old bearers connected to the master or secondary node. |
| RB Resume Request/Response | Master or Secondary←→Common UP | The Request message is generated by the master or secondary node and, when DC is activated in the common anchored UP, this RB resume request/response is transmitted in a signaling message to control to resume the old bearer connected to the master or secondary node. |

Tables 2 to 6 summarize master information elements included in the common anchored user plane information (Anchored UP information), information elements included in the master node handover information (Master Node HO info), and information elements included in the dual connectivity handover information (DC Handling Info) and RB control request/resume/response messages.

TABLE 2

| Message/Element name | Detailed Information Elements | Option | Condition |
| --- | --- | --- | --- |
| Anchored UP information | Anchored UP TEID/IP address: GTP tunnel endpoint ID and IP address in use for the corresponding terminal in the common anchored user plane<br>S1 tunnel TEID/IP address: GTP tunnel endpoint ID and IP address of S1 interface connected to the core for the corresponding terminal in the common anchored user plane<br>Anchored UP DRB ID: DRB ID information in use for the corresponding terminal in the | Optional | When a master node requests to a secondary node for secondary node addition in the state where a terminal supports corresponding DC function/structure and operates in DC, when a source master node requests to a target master node for handover, and |

TABLE 2-continued

| Message/Element name | Detailed Information Elements | Option | Condition |
|---|---|---|---|
| | common anchored user plane DC Bearer type change information: Information on the bearer of old bearer type or the bearer changed from the old bearer type for the corresponding terminal in the common anchored user plane Security key: Old or new security key information to be applied to each or all of the bearers for the corresponding terminal in the common anchored user plane Security key change indicator: Indicator indicating whether to change the security key to be applied to each or all of the bearers for the corresponding terminal in the common anchored user plane Reuse Protocol Type: Information indicating whether to reuse or reset each protocol (PDCP, RLC, MAC) on the old bearers in use for the corresponding terminal in the common anchored user plane | | when a master node requests to a secondary node for secondary node addition in changing secondary node |

TABLE 3

| Message/Element name | Detailed Information Elements | Option | Condition |
|---|---|---|---|
| Master Node HO Information | Target CP TEID/IP address: GTP tunnel endpoint ID and IP address for target master node being changed for interworking with the master node in the secondary node control plane Handover type: Handover type information of master node (intra-node HO or inter-node HO) Anchored UP TEID/IP address: GTP tunnel endpoint ID and IP address in use for the corresponding terminal in the common anchored user plane Anchored UP DRB ID: DRB ID information in use for the corresponding terminal in the common anchored user plane DC bearer type change information: Information on the bearer of old bearer type or the bearer changed from the old bearer type for the corresponding terminal in the common anchored user plane Security key: Old or new security key information to be applied to each or all of the bearers for the corresponding terminal in the common anchored user plane Security key change indicator: Indicator indicating whether to change the security key to be applied to each or all of the bearers for the | Optional | For a handover between master nodes or in a master node (inter-/intra-master node handover) in the state where the terminal supports the corresponding DC function/structure and operates in DC |

TABLE 3-continued

| Message/Element name | Detailed Information Elements | Option | Condition |
|---|---|---|---|
| | corresponding terminal in the common anchored user plane Reuse Protocol Type: Information indicating whether to reuse or reset each protocol (PDCP, RLC, MAC) on the old bearers in use for the corresponding terminal in the common anchored user plane | | |

TABLE 4

| Message/Element name | Detailed Information Elements | Option | Condition |
|---|---|---|---|
| DC Handling Information | Anchored UP DRB ID: DRB ID information in use for the corresponding terminal in the common anchored user plane DC Bearer type change information: Information on the bearer of old bearer type or the bearer changed from the old bearer type for the corresponding terminal in the common anchored user plane Security key change indicator: Indicator indicating whether to change the security key to be applied to each or all of the bearers for the corresponding terminal in the common anchored user plane RB keep/reset information: information indicating whether to keep or reset old bearer type in use for the corresponding terminal in the common anchored user plane Reuse Protocol Type: Information indicating whether to reuse or reset each protocol (PDCP, RLC, MAC) on the old bearers in use for the corresponding terminal in the common anchored user plane | Optional | For master node handover, DC bearer type change, and secondary node addition/release/change in the state where the terminal supports the corresponding DC function/structure and operates in DC |

TABLE 5

| Message/Element name | Detailed Information Elements | Option | Condition |
|---|---|---|---|
| RB Control Request/Response | Target CP TEID/IP address: GTP tunnel endpoint ID and IP address for target master node being changed for interworking with the master node in the secondary node control plane S1 tunnel TEID/IP address: GTP tunnel | | For master node handover, DC bearer type change, and secondary node addition/release/change in the state where the terminal supports the corresponding DC function/structure and operates in DC |

TABLE 5-continued

| Message/Element name | Detailed Information Elements | Option | Condition |
|---|---|---|---|
| | endpoint ID and IP address of S1 interface connected to the core for the corresponding terminal in the common anchored user plane
Anchored UP DRB ID: DRB ID information in use for the corresponding terminal in the common anchored user plane
DC bearer type change information: Information on the bearer of old bearer type or the bearer changed from the old bearer type for the corresponding terminal in the common anchored user plane
Security key: Old or new security key information to be applied to each or all of the bearers for the corresponding terminal in the common anchored user plane
-Security key change indicator: Indicator indicating whether to change the security key to be applied to each or all of the bearers for the corresponding terminal in the common anchored user plane
RB keep/reset information: information indicating whether to keep or reset old bearer type in use for the corresponding terminal in the common anchored user plane
Reuse Protocol Type: Information indicating whether to reuse or reset each protocol (PDCP, RLC, MAC) on the old bearers in use for the corresponding terminal in the common anchored user plane | | |

TABLE 6

| Message/Element name | Detailed Information Elements | Option | Condition |
|---|---|---|---|
| RB Resume/ Request/Response | Anchored UP DRB ID: DRB ID information in use for the corresponding terminal in the common anchored user plane
RB resume information: Information indicating whether to resume the bearer in use for the corresponding terminal in the common anchored user plane when it is determined that a dual connectivity operation or handover succeeds. | Optional | For master node handover, DC bearer type change, and secondary node addition/release/change in the state where the terminal supports the corresponding DC function/structure and operates in DC |

The methods of the disclosed embodiments are advantageous in terms of protecting against time delay and data loss caused by inefficient secondary cell release and addition operations or user plane reset and security key update procedures. The proposed method is also advantageous in terms of dispensing with a data forwarding procedure between user planes and a path update procedure between a user plane and a core network.

The embodiments disclosed in the specification and drawings are proposed to help explain and understand the disclosure rather than to limit the scope of the disclosure. Thus the scope of the disclosure should be interpreted to include the disclosed embodiments and all possible variations and modifications derived therefrom on the basis of the technical principle of the disclosure.

INDUSTRIAL APPLICABILITY

The disclosure may be applied when a terminal attempts to establish dual connectivity in a wireless communication network.

The invention claimed is:

1. A method for a master node control plane to provide dual connectivity to a user terminal in a wireless communication network, the method comprising:
    transmitting a secondary node addition request message to a secondary control plane based on the user terminal in a radio resource control (RRC) connected state to the master node control plane needing dual connectivity;
    transmitting an RRC connection reconfiguration message to the user terminal in response to receive a secondary node addition request response message from the secondary control plane;
    transmitting a secondary node reconfiguration complete message to the secondary control plane based on receiving an RRC connection reconfiguration complete message from the user terminal; and
    performing a path update procedure for the user terminal with an access and mobility function entity.

2. The method of claim 1, wherein a bearer configured to the user terminal is a master cell group (MCG) bearer or MCG split bearer.

3. The method of claim 2, further comprising:
    transmitting a radio bearer control request message including a keep indicator to a common anchored user plane after transmitting the secondary node addition request message; and
    transmitting the RRC connection reconfiguration message to the user terminal based on receiving a radio bearer control response message and the secondary node addition request response message.

4. The method of claim 2, further comprising:
    transmitting a radio bearer resume request message to a common anchored user plane after transmitting the secondary node reconfiguration complete message to the secondary control plane; and
    performing the path update procedure based on receiving a radio bearer resume response message from the common anchored user plane.

5. The method of claim 1, wherein a bearer configured to the user terminal is a secondary cell group (SCG) bearer or SCG split bearer.

6. A method for a secondary node control plane to provide dual connectivity to a user terminal in a wireless communication network, the method comprising:
    receiving a secondary node addition request message for the user terminal in a connected state to a master node control plane from the master node control plane;
    generating and transmitting a secondary node addition request response message to the master node control plane in response to the secondary node addition request message; and
    performing a random access procedure with the user terminal based on receiving a secondary node reconfiguration complete message from the master node control plane.

7. The method of claim 6, wherein a bearer configured to the user terminal is a secondary cell group (SCG) bearer or SCG split bearer.

8. The method of claim 7, further comprising:
    transmitting a radio bearer control request message including a keep indicator to a common anchored user plane based on receiving the secondary node addition request message; and
    transmitting the secondary node addition request response message to the master node control plane based on receiving a radio bearer control response message from the common anchored user plane.

9. The method of claim 8, further comprising transmitting a radio bearer resume request message to the common anchored user plane after performing the random access procedure with the user terminal.

10. The method of claim 6, wherein a bearer configured to the user terminal is a master cell group (MCG) bearer or MCG split bearer.

11. A method for a common anchored user plane to provide dual connectivity to a user terminal in a wireless communication network, the method comprising:
    maintaining a bearer configured to the user terminal based on receiving a radio bearer control request message including a keep indicator from a master node control plane or a secondary node control plane for the user terminal in a radio resource control (RRC) connected state to the master node control plane;
    generating and transmitting a radio bearer control response message to the control plane that transmitted the radio bearer control request message;
    generating and transmitting a radio bearer resume response message to the master node control plane and the secondary node control plane based on receiving a radio bearer resume request message from the master node control plane and the secondary node control plane;
    performing bearer path update for transmitting data from an access and mobility function entity to the user terminal; and
    transmitting user data to the user terminal through an updated bearer path.

12. The method of claim 11, wherein the bearer configured to the user terminal is a master cell group (MCG) bearer or MCG split bearer.

13. The method of claim 11, wherein the bearer configured to the user terminal is a secondary cell group (SCG) bearer or SCG split bearer.

14. A wireless communication system for supporting dual connectivity, the system comprising:
    a plurality of master radio communication units that each have communication areas equal or different in size and support the dual connectivity for at least one user terminal and that include at least part of a communication area of at least one secondary node radio communication unit;

a common anchored user plane configured to communicate user data with the plurality of master radio communication units, forward the user data to one of the at least one user terminal located in the communication area of at least one of the plurality of master radio communication units, and perform an operation for maintaining a bearer for transmitting the user data to the user terminal for at least one of secondary node addition, secondary node release, secondary node's master node modification, secondary node change, handover, bearer type change, and inter-master node handover;

a secondary node control plane configured to control the at least one secondary node radio communication unit to transmit the user data via the common anchored user plane and maintain the bearer for transmitting the user data to the user terminal for at least one of a secondary node addition, a secondary node release, a secondary node's master node modification, a secondary node change, a handover, a bearer type change, and an inter-master node handover; and a master node control plane configured to control the plurality of master radio communication units to transmit the user data vis the common anchored user plane and maintain the bearer for transmitting the user data to the user terminal for at least one of the secondary node addition, the secondary node release, the secondary node's master node modification, the secondary node change, the handover, the bearer type change, and the inter-master node handover.

\* \* \* \* \*